(12) United States Patent
Nishizaki et al.

(10) Patent No.: US 7,949,959 B2
(45) Date of Patent: May 24, 2011

(54) TARGET ESTIMATION DEVICE AND TARGET ESTIMATION METHOD

(75) Inventors: Makoto Nishizaki, Tokyo (JP); Tsuyoshi Inoue, Nara (JP); Satoshi Matsuura, Kyoto (JP)

(73) Assignee: Panasonic Corporation, Osaka (JP)

( * ) Notice: Subject to any disclaimer, the term of this patent is extended or adjusted under 35 U.S.C. 154(b) by 475 days.

(21) Appl. No.: 12/159,364

(22) PCT Filed: Oct. 26, 2007

(86) PCT No.: PCT/JP2007/070920
§ 371 (c)(1),
(2), (4) Date: Jun. 26, 2008

(87) PCT Pub. No.: WO2008/056548
PCT Pub. Date: May 15, 2008

(65) Prior Publication Data
US 2010/0058237 A1 Mar. 4, 2010

(30) Foreign Application Priority Data
Nov. 10, 2006 (JP) ................. 2006-305833

(51) Int. Cl.
*G06F 11/00* (2006.01)
*G06F 17/30* (2006.01)
(52) U.S. Cl. ........ 715/811; 715/812; 707/737; 707/738; 707/749
(58) Field of Classification Search .................. 715/811, 715/812; 707/732, 737–739, 749, 751, E17.014
See application file for complete search history.

(56) References Cited

U.S. PATENT DOCUMENTS

| | | | | |
|---|---|---|---|---|
| 5,918,222 A | * | 6/1999 | Fukui et al. | 1/1 |
| 7,283,992 B2 | * | 10/2007 | Liu et al. | 1/1 |
| 7,386,371 B2 | * | 6/2008 | Kuge et al. | 701/1 |
| 2004/0220925 A1 | * | 11/2004 | Liu et al. | 707/3 |

(Continued)

FOREIGN PATENT DOCUMENTS

EP 1 079 314 2/2001

(Continued)

OTHER PUBLICATIONS

International Search Report issued Jan. 29, 2008 in the International (PCT) Application of which the present application is the U.S. National Stage.

(Continued)

*Primary Examiner* — Tadeese Hailu
(74) *Attorney, Agent, or Firm* — Wenderoth, Lind & Ponack, L.L.P.

(57) ABSTRACT

A target estimation device that appropriately estimates a function targeted by a user from among functions of an operated apparatus includes: an item inputting unit (102) that obtains an item; a function representation storing unit (107) that stores function names of the operated apparatus; an identical word detecting unit (116) that detects a category of a word identical between each of the function names and the item; an operation intention calculating unit (117) that changes a method for calculating similarities between the item and the respective function names, for each of the function names, depending on the detected category, and that calculates the similarities as degrees of intentions of the user who has selected the item, using the changed calculation method; and a target estimation unit (112) that estimates a function so that the function having a higher degree of an intention is the function targeted by the user.

12 Claims, 23 Drawing Sheets

U.S. PATENT DOCUMENTS

2005/0131589 A1 * 6/2005 Yamamura et al. ............... 701/1

FOREIGN PATENT DOCUMENTS

| | | |
|---|---|---|
| JP | 58-33993 | 7/1983 |
| JP | 5-11954 | 1/1993 |
| JP | 7-121563 | 5/1995 |
| JP | 8-44771 | 2/1996 |
| JP | 8-153004 | 6/1996 |
| JP | 8-161353 | 6/1996 |
| JP | 11-195041 | 7/1999 |
| JP | 2000-137726 | 5/2000 |
| JP | 2001-67360 | 3/2001 |
| JP | 2003-186590 | 7/2003 |
| JP | 2003-256099 | 9/2003 |
| JP | 2004246398 * | 9/2004 |

OTHER PUBLICATIONS

Muneo Kitajima, "*A Comprehension-Based Model of Deliberate Search*", Human Interface '99, pp. 831-836.

* cited by examiner

FIG. 5

| Item ID | Item name | Operation object | Operation action | Peripheral information |
|---|---|---|---|---|
| Sel(1) | Title deletion | title | delete | — |
| Sel(2) | Program list browsing | program list | browse | — |
| Sel(3) | Entire recording | — | record | entire |
| Sel(4) | Function selection | function | select | — |
| Sel(5) | HDD setting | HDD | set | — |
| .. | .. | .. | .. | .. |
| Sel(M) | Time setting | time | set | — |

| Function ID | Function name (description) | Operation object | Operation action | Peripheral information |
|---|---|---|---|---|
| F(1) | delete all recorded programs (titles) | recorded, programs, titles | delete | all |
| F(2) | set clock time | clock, time | set | — |
| F(3) | genre search and timer record program | program | timer record | genre search |
| .. | .. | .. | .. | .. |
| F(N-1) | configure network connection | network connection | configure | — |
| F(N) | browse playlist | playlist | browse | — |

FIG. 7

Function representation signal — 701

| Function ID | Function name (description) | Operation object | Operation action | Peripheral information |
|---|---|---|---|---|
| F(1) | delete all recorded programs (titles) | recorded programs, titles | delete | all |
| F(2) | set clock time | clock, time | set | — |
| .. | .. | .. | .. | .. |
| F(N) | browse playlist | playlist | browse | — |

702

Item information — 703

| Item ID | Operation object | Operation action | Peripheral information |
|---|---|---|---|
| Sel(2) | program list | browse | — |

| Estimation order | Function ID | Function name | Score |
|---|---|---|---|
| 1 | F(1) | Delete all recorded programs (titles) | 0.52 |
| 2 | F(2) | Record program (title) | 0.50 |
| 3 | F(3) | Timer record program using program list | 0.45 |
| 4 | F(10) | Keyword search and timer record program | 0.43 |
| 5 | F(30) | Cancel timer recording | 0.20 |
| : | : | : | : |
| M | F(2) | Set clock time | 0.01 |

| Function | | Item | | | | |
|---|---|---|---|---|---|---|
| | | Operation object | | Operation action | |
| | | function | program list | browse | select | browse |
| Operation object | recorded program titles | 0.3 | 0.7 | | 0.2 | 0.1 |
| | clock time | 0.3 | 0.5 | | 0.2 | 0 |
| | program | 0.4 | 0.7 | | 0.2 | 0.2 |
| | network connection | 0.3 | 0 | | -0.1 | 0.2 |
| | playlist | 0.2 | 0.5 | | 0.3 | 0.4 |
| Operation action | delete | 0.4 | 0.4 | | 0.3 | 0.1 |
| | set | 0.2 | 0.3 | | 0.6 | 0.4 |
| | timer record | 0.4 | 0.6 | | 0.3 | 0.4 |
| | browse | 0.2 | 0.3 | | 0.3 | 1 |

| Function | | Item ID | | Score |
|---|---|---|---|---|
| Function ID | Function name | function selection | program list browsing | |
| F(1) | delete all recorded programs (titles) | 0.3 | 0.3 | 0.3 |
| F(2) | set clock time | 0.3 | 0.3 | 0.3 |
| F(3) | genre search and timer record program | 0.3 | 0.4 | 0.4 |
| F(N-1) | configure network connection | 0.2 | 0.2 | 0.2 |
| F(N) | browse playlist | 0.3 | 0.6 | 0.5 |

Ranked first F(N)
Ranked second F(3)
Ranked third F(1),F(2)
Ranked fifth F(N-1)

(b)

| Function | | Item ID | | Score |
|---|---|---|---|---|
| Function ID | Function name | function selection | program list browsing | |
| F(1) | delete all recorded programs (titles) | 0.3 | 0.5 | 0.4 |
| F(2) | set clock time | 0.3 | 0.3 | 0.3 |
| F(3) | genre search and timer record program | 0.3 | 0.7 | 0.5 |
| F(N-1) | configure network connection | 0.2 | 0.2 | 0.2 |
| F(N) | browse playlist | 0.3 | 0.7 | 0.5 |

Ranked first F(3),F(N)
Ranked second F(1)
Ranked fourth F(2)
Ranked fifth F(N-1)

FIG. 16

| Function ID | Conventional | Present invention |
|---|---|---|
| F(1),F(3),F(N) | 0.36 | 0.46 |
| F(2),F(N-1) | 0.25 | 0.25 |
| Difference | 0.11 | 0.21 |

FIG. 20

| Element | Value |
|---|---|
| Gender | Male |
| Age | 17 |
| Use history of DVD recorder | 0.5 year |
| Manufacturer of DVD recorder | Company C |
| Model name of DVD recorder | DV-010 |

| Profile | | | | Weight Wa of operation object | Weight Wb of operation action |
|---|---|---|---|---|---|
| Gender | Age | Use history of DVD recorder (year) | Manufacturer of DVD recorder | | |
| Male | ~20 | ~0.5 | Company A | 1.0 | 0.2 |
| | | | Company B | 1.0 | 1.0 |
| | | | Company C | 0.2 | 1.0 |
| | | 0.5~2 | ... | ... | ... |
| | | 2~ | ... | ... | ... |
| | 21~40 | ~0.5 | ... | ... | ... |
| | | 0.5~2 | ... | ... | ... |
| | | 2~ | ... | ... | ... |
| | 40~ | ~0.5 | ... | ... | ... |
| | | 0.5~2 | ... | ... | ... |
| | | 2~ | ... | ... | ... |
| Female | ~20 | ... | ... | ... | ... |
| | 21~40 | ... | ... | ... | ... |
| | 40~ | ... | ... | ... | ... |

1402a

TARGET ESTIMATION DEVICE AND TARGET ESTIMATION METHOD

TECHNICAL FIELD

The present invention relates to a target estimation device for supporting a user who operates home appliances equipped with interfaces to be operated in a menu-selection mode, such as a computer, a Digital Versatile Disk (DVD) recorder, a digital television, a cellular phone, and a car navigation system. The present invention relates, in particular, to a target estimation device and a target estimation method that estimate a user's target based on operations of selecting items and that provide a result of the estimation as support information.

BACKGROUND ART

Since electric appliances, such as a computer, a DVD recorder, and a cellular phone have added more various functions, operations of the electric appliances have become more complicated in recent years. Thus, the appliances have adopted interfaces to be operated in a menu-selection mode, and in particular, hierarchical interfaces operated in order to decrease complexity of the operations and to facilitate use of many functions of the appliances.

However, in such hierarchical interfaces, there are cases where the user has difficulties to understand descriptions of items to be displayed on a menu and where there is a conceptual gap in the descriptions of items between interface designers and users who actually use the appliances. For example, when a user operates a DVD recorder and desires to perform a task of translating subtitles into English, a gap occurs between an item imagined by the user who is to perform the task and an item to be actually displayed on a menu. Thus, a problem that the user cannot find a desired function arises. Since the user is confused about not finding a suitable function due to a conceptual gap between the interface designer and the user for the task, essentially in an interface to be operated in a menu-selection mode, the user is desirably provided with advantageous support for such a confused state.

Conventionally, apparatuses that solve such a confused state have been suggested (for example, see Patent Reference 1). The apparatus disclosed in Patent Reference 1 has functions each having related keywords assigned in advance thereto. The user presses a Help key and inputs keywords related to a function targeted by the user so that functions corresponding to the keywords are searched (help search). Thereby, the function targeted by the user can be estimated, thus realizing provision of operation support. However, there are cases where the apparatus in Patent Reference 1 has difficulties in assigning all keywords that are possibly inputted by the user, and where the user cannot input any appropriate keyword. In these cases, the apparatus cannot appropriately estimate a function targeted by the user.

Thus, in order to solve such a problem, apparatuses that estimate a target of a user using operation histories of the user have been suggested (for example, see Patent Reference 2).

Besides the aforementioned help search using inputted keywords, the apparatus disclosed in Patent Reference 2 generates operation histories until the time when the user presses a Help key, by assigning keywords to each of operation buttons and items to be displayed. Thus, this apparatus can estimate a function targeted by the user, using the operation histories to provide operation support.

FIG. 1 is a block diagram illustrating a configuration of the target estimation device disclosed in Patent Reference 2.

The target estimation device includes an input unit 2001, a required sentence storing unit 2002, a search unit 2003, a display unit 2004, a history information storing unit 2005, an operation-history vector generating unit 2006, and a function description database 2007. The input unit 2001 is included in a keyboard or a mouse, and accepts operation information and a keyword to be used in help search. The history information storing unit 2005 stores the operation information accepted by the input unit 2001. The operation-history vector generating unit 2006 generates a feature vector corresponding to an operation state, using an operation vector dictionary and operation information in N step that has been stored in the history information storing unit 2005 up to now. The search unit 2003 calculates an inner product of the feature vector corresponding to the operation state and each function description vector assigned to each function stored in the function description database 2007 so as to determine each score of the functions corresponding to the operation history (feature vector). Furthermore, the search unit 2003 also calculates scores using the help search, and in combination with the scores calculated using the help search and the scores by the feature vector, it searches a function to be an object for help, in other words, a function targeted by the user. The display unit 2004 displays, in order of the scores, functions obtained as a result of the search by the search unit 2003.

Patent Reference 1: Unexamined Patent Application Publication No. 7-121563
Patent Reference 2: Unexamined Patent Application Publication No. 2000-137726

DISCLOSURE OF INVENTION

Problems that Invention is to Solve

However, even with the target estimation device of Patent Reference 2, there is a problem that a target of the user cannot be appropriately estimated.

In general, in a display-based human computer interface (HCI), the user selects information displayed on a display by evaluation of the information in view of a goal of a task, and performs the next operation by observing a change brought by a result of the selection and evaluating the change. In HCI, it is known that information displayed on a display and others is important, and a strategy referred to as a label following strategy is used as one of characteristics of the user who performs selections (A comprehension-Based Model of Deliberate Search, Human Interface '99, 831-836: Non-Patent Reference 1). The label following strategy is an operation strategy for selecting the most suitable function describing a target from among objects (descriptions) on a display, when the user selects the next operation.

The label following strategy is also observed in an operation interface to be operated in a menu-selection mode as one of display-based HCIs. Subjects were actually given a task (a function to be a target), such as "delete recorded program" in a DVD recorder, and the behaviors of the subjects were observed. The observation showed that the subjects tended to select an item including a part of words describing a task, such as "browse program list". The subjects followed a label, in other words, executed an operation by focusing attention on a part of information included in the item.

In contrast, the target estimation device of Patent Reference 2 assigns one keyword to each of the items. Thus, the target estimation device cannot represent differences of attentions between the items, although the differences vary according to each of the tasks. Furthermore, when the target estimation device actually estimates a function targeted by the user, the sufficient performance cannot be obtained.

Thus, the present invention has been conceived in view of the problems, and an object of the present invention is to provide a target estimation device capable of appropriately estimating a function targeted by the user from among functions included in an operated apparatus.

Means to Solve the Problems

In order to achieve the object, the target estimation device according to the present invention is a target estimation device that estimates a function targeted by a user, for an operated apparatus that identifies the function corresponding to at least an item selected by the user and executes the function, and includes: an item obtaining unit configured to obtain an item selected by the user, the item consisting of a plurality of words; a function storing unit configured to store function names for each of functions of the operated apparatus, each of the function names consisting of a plurality of words and representing one of the functions of the operated apparatus; an identical word detecting unit configured to detect a category of a word identical between each of the function names and the item obtained by the item obtaining unit, for each of the function names stored by the function storing unit; an intention calculating unit configured, for each of the function names stored by the function storing unit, to change a calculation method for calculating similarities between the item and the respective function names depending on the category detected by the identical word detecting unit, and to calculate the similarities as degrees of intentions of the user who has selected the item for the function represented by a function name, using the changed calculation method; and an estimation unit configured to estimate a function from among the functions so that the function having a higher degree of an intention is the function targeted by the user, the degree being calculated by the intention calculating unit.

Thereby, when the user selects an item, a category of a word identical between a function name of a function and the item is detected, for each of functions included in an operated apparatus. Thus, the target estimation device can identify a point where the user focuses on, in the item selected for the function. For example, when an item and a function name are consisted of a plurality of words and are represented by an object A and an action B, respectively, an operation object that is a category of the word A and an operation action that is a category of the word B are detected. Thus, whether the user selects the item by focusing attention on an operation object of the item or whether the user selects the item by focusing attention on an operation action of the item can be identified for each of the functions of the operated apparatus. Then, since a calculation method is changed depending on a function according to the type detected, a degree of an intention of the user can be appropriately calculated using the calculation method according to a point where the user focuses on in an item selected by the user for each function. In other words, conventionally, a degree of an intention is calculated in a single calculation method for all items regardless of the user's attention for the items, and thus the degree cannot appropriately be calculated. In contrast, the present invention makes it possible to appropriately calculate a degree of an intention of the user, because the calculation method is changed according to a point where the user focuses on in an item. Since the function having a higher degree of an intention is estimated as the function targeted by the user, the function targeted by the user can be appropriately estimated, and the user can be sufficiently supported for operating an operated apparatus.

Furthermore, the item and each of the function names may include at least a word indicating an operation object, the function names being stored by the function storing unit, and the intention calculating unit may calculate the degree of the intention using a calculation method that assigns more weight to the word indicating the operation object from among the plurality of words included in the item, when the category detected by the identical word detecting unit is an operation object. For example, the item and each of the function names stored by the function storing unit may further include at least a word indicating an operation action for the operation object, and the intention calculating unit may use a calculation method that assigns more weight to a semantic similarity between a word that indicates the operation object and is included in an item, and a function name including a word that indicates the operation object and a word that indicates the operation action than a semantic similarity between a word that indicates the operation action and is included in the item, and the function name including the word that indicates the operation object and the word that indicates the operation action.

Thereby, when the user focuses on an operation object of an item, a degree of the intention is calculated by assigning more weight to the operation object. For example, when the following similarities are available, a degree of an intention is calculated using a calculation method that assigns more weight to similarities $\alpha 1$ and $\alpha 2$, rather than similarities $\alpha 3$ and $\alpha 4$. The similarities include: the similarity $\alpha 1$ between a word indicating an operation object of a function name and a word indicating an operation object of an item; the similarity $\alpha 2$ between a word indicating an operation action of a function name and a word indicating an operation object of an item; the similarity $\alpha 3$ between a word indicating an operation object of a function name and a word indicating an operation action of an item; and the similarity $\alpha 4$ between a word indicating an operation action of a function name and a word indicating an operation action of an item. Alternatively, a degree of an intention is calculated only using the similarities $\alpha 1$ and $\alpha 2$ without using the similarities $\alpha 3$ and $\alpha 4$. Thus, since the similarities $\alpha 3$ and $\alpha 4$ related to words each indicating an operation action of an item where the user does not focus on are hardly reflected for calculating a degree of an intention, the degree of the intention can be appropriately calculated.

Furthermore, the item and each of the function names stored by the function storing unit may include at least a word indicating an operation action, and the intention calculating unit may calculate the degree of the intention using a calculation method that assigns more weight to one of the words indicating the operation action from among the words included in the item, when the category detected by the identical word detecting unit is an operation action. For example, the item and each of the function names stored by the function storing unit further may include at least a word indicating an operation object for the operation action, and the intention calculating unit may use a calculation method that assigns more weight to a semantic similarity between a word that indicates the operation action and is included in an item, and a function name including a word that indicates the operation object and a word that indicates the operation action than a semantic similarity between a word that indicates the operation object and is included in the item, and the function name including the word that indicates the operation object and the word that indicates the operation action.

Thereby, when the user focuses on an operation object of an item, a degree of the intention is calculated by assigning more weight to the operation object. For example, when the following similarities are available, a degree of an intention is calculated using a calculation method that assigns more weight to similarities α3 and α4, rather than similarities α1 and α2. The similarities include: the similarity α1 between a word indicating an operation object of a function name and a word indicating an operation object of an item; the similarity α2 between a word indicating an operation action of a function name and a word indicating an operation object of an item; the similarity α3 between a word indicating an operation object of a function name and a word indicating an operation action of an item; and the similarity α4 between a word indicating an operation action of a function name and a word indicating an operation action of an item. Alternatively, a degree of an intention is calculated using only the similarities α3 and α4 without using the similarities α1 and α2. Thus, since the similarities α1 and α2 related to words each indicating an operation object of an item where the user does not focus on are hardly reflected for calculating a degree of an intention of the user, the degree of the intention can be appropriately calculated.

The target estimation device may further include: an intention memory in which a degree of an intention calculated by the intention calculating unit for each of the functions is stored; and an intention storing unit configured to store, in the intention memory, degrees of intentions calculated for each of the functions by the intention calculating unit, each time the item obtaining unit obtains an item, wherein the estimation unit may read, from the intention storing unit, the degrees of the intentions between each of the functions and each of the plurality of items, calculate an average of the degrees of the intentions for each of the functions as a score, and estimate a function so that the function having a higher score is the function targeted by the user.

Thereby, each time the user selects an item, a degree of an intention between a function and the item for each of functions are calculated. When a function targeted by the user is estimated, an average of the degrees that are calculated for each function is calculated to calculate a score. Since the function having a higher score is estimated as the function targeted by the user, the function targeted by the user can be appropriately estimated with regard to all items selected by the user.

The target estimation device may further include: an estimation instructing unit configured to instruct the estimation unit to estimate the function targeted by the user according to an operation of the user; and a presenting unit configured to present the function estimated by the estimation unit to the user, wherein the estimation unit may estimate the function targeted by the user, when the estimation instructing unit instructs the estimation unit. The target estimation device may further include: a confused state detecting unit configured to detect whether or not the user is confused about selecting an item; and a presenting unit configured to present the function estimated by the estimation unit to the user, wherein the estimation unit may estimate the function targeted by the user, when the confused state detecting unit detects that the user is confused.

Thereby, when the user is confused about selecting an item, a function targeted by the user is estimated and is presented to the user, sufficiently supporting the user who operates the operated apparatus.

The target estimation device may further include a message presenting unit configured to determine whether or not the score for each of the functions satisfies a predetermined condition, and present a message prompting the user to select an item when the score does not satisfy the predetermined condition, the score being calculated by the estimation unit.

For example, when scores for all functions are lower than a reference value, or when there is no difference between the scores for each function, each of the functions are hardly prioritized. In contrast, since a message for prompting the user to select an item is presented in the present invention, a score for any of the functions can be increased and the scores can be different from each other, and thus, the function targeted by the user can be appropriately estimated.

The target estimation device may further include a profile information obtaining unit configured to obtain profile information indicating a characteristic of the user, wherein the intention calculating unit may adjust the weight according to the profile information.

Since the weight is adjusted according to a characteristic of the user, the function targeted by the user can be appropriately estimated.

According to the present invention, when a word is identical between a function and an item selected in an operation among various operations, for each of the functions, a degree of an operation intention can be calculated in a calculation method according to a point where the user focuses on, by calculating similarities between the identical words, unlike a conventional method that assigns one keyword to each item. Thus, precision of estimating a target can be improved, ensuring provision of an operation support.

The present invention can be realized not only as such a target estimation device, but also as: an operation support device that supports operating of an operated apparatus by presenting a function that has been estimated by the target estimation device and is targeted by the user; as a target estimation method; as an operation support method; as a program; and as a computer-readable recording medium that stores the program, such as a CD-ROM or a DVD-RAM.

Effects of the Invention

The target estimation device according to the present invention makes it possible to estimate a function targeted by the user by assigning more weight to information that is focused by the user and is obtained when the user selects an item, enabling more precise target estimation. Furthermore, when a target is estimated, in other words, a function is presented to a user, the user may be supported for operating an operated apparatus. Thus, when the user uses an operated apparatus for the first time, or even when the user has difficulties in operating the operated apparatus, for example, the user can easily operate the apparatus by tracing functions presented on a display screen.

BRIEF DESCRIPTION OF DRAWINGS

FIG. 5 illustrates information stored in an item representation storing unit.

FIG. 6 illustrates information stored in a function representation storing unit.

FIG. 7 illustrates information included in a first calculation object signal.

FIG. 10 illustrates details of support information.

FIG. 15 illustrates comparison of scores for each function calculated by the target estimation device according to the present invention and by a conventional target estimation device.

FIG. 16 is a drawing for describing that the target estimation device appropriately estimates a target.

FIG. 20 illustrates details of profile information.

FIG. 21 illustrates details of operation characteristic information.

NUMERICAL REFERENCES

Figure 1:
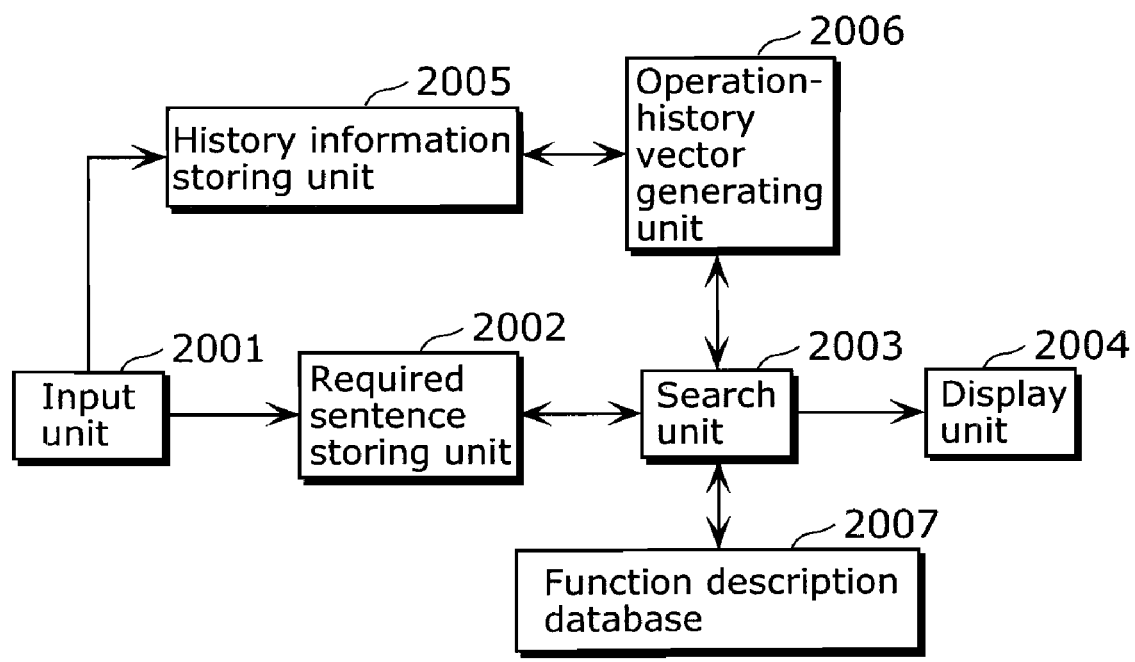
FIG. 1 illustrates a configuration drawing of a conventional target estimation device.

101 Input unit
102 Item input unit
103 Output unit
104 Item presenting unit
105 Operation support presenting unit
106 Operation intention history memory
107 Function representation storing unit
108 Item representation storing unit
109 Input-output control unit
110 Device control unit
111 Operation support deciding unit
112 Target estimation unit
113 Calculating unit
114 Word concept storing unit
115 Support request input unit
116 Identical word detecting unit
117 Operation intention calculating unit
121 Input signal
122 Output signal
123 Operation intention history signal
124 Function representation signal
125 Item representation signal
126 Device control signal
127 Operation support signal
128 Operation support object signal
129 Target estimation object signal
130 First calculation object signal
131 Operation intention signal
132 Word-to-word similarity definition signal
133 Second calculation object signal
134 Target estimation result signal
401 Top menu
402 Menu
403 Menu
502 Cursor key
503 Enter button
504 Return button
505 Power button
506 Menu button
507 Help button
601 Item representation database
1201 Confusion state detecting unit
1401 Profile input unit
1402 Operation characteristic storing unit
1403 Profile-dependent calculating unit
1411 Operation characteristic signal
1501 Profile-dependent operation intention calculating unit
1701 Function representation database

BEST MODE FOR CARRYING OUT THE INVENTION

Embodiments according to the present invention will be described below with reference to drawings.

First Embodiment

Figure 2:
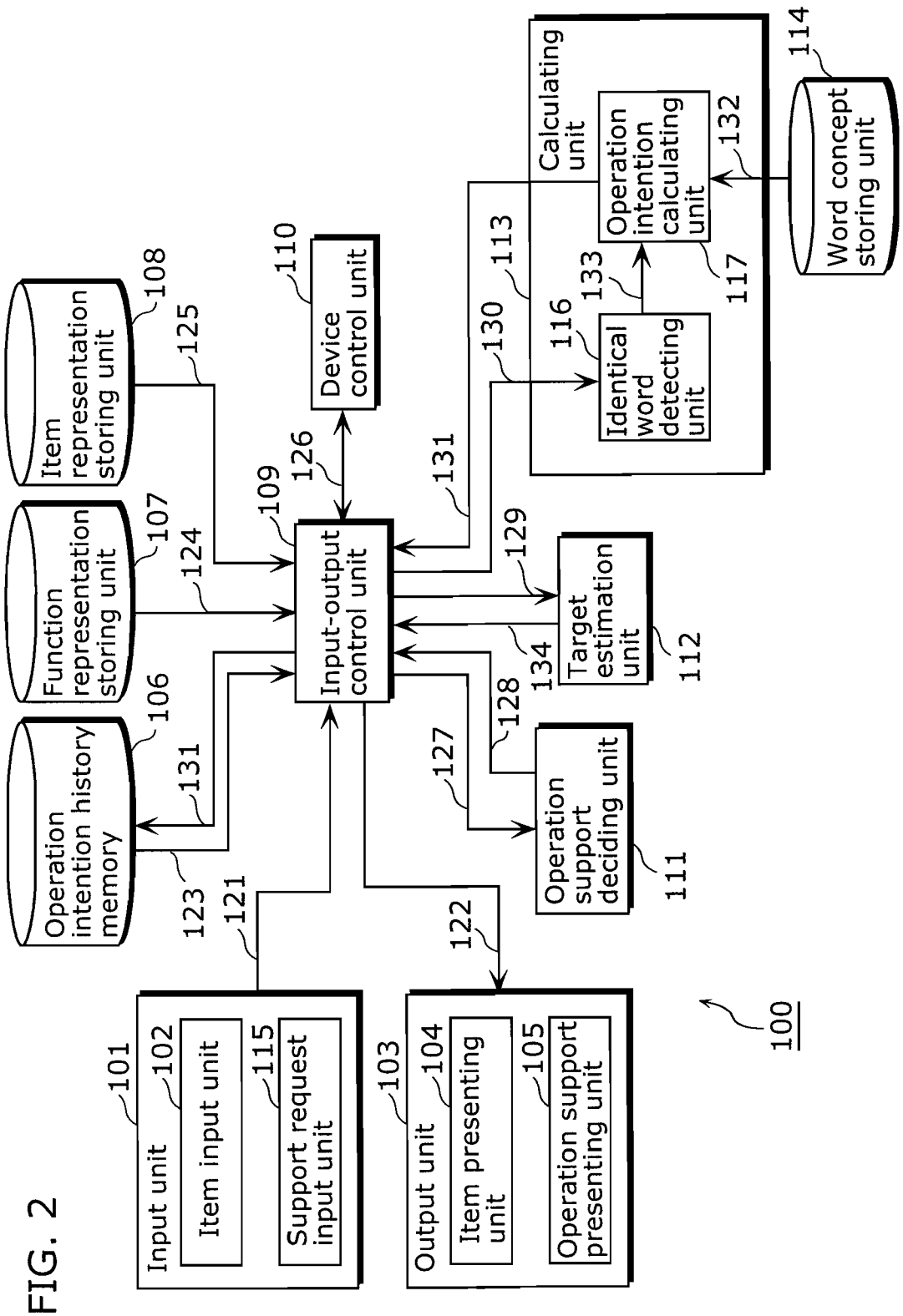
FIG. 2 illustrates a configuration drawing of a target estimation device in the first embodiment of the present invention.

FIG. 2 illustrates a configuration of a target estimation device in the first embodiment of the present invention.

The target estimation device 100 in the first embodiment appropriately estimates a function targeted by a user from among functions included in an operated apparatus, and can sufficiently support the user for operating the operated apparatus. The target estimation device 100 includes an input unit 101, an output unit 103, an input-output control unit 109, a device control unit 110, an operation support deciding unit 111, a target estimation unit 112, a calculating unit 113, a word concept storing unit 114, an operation intention history memory 106, a function representation storing unit 107, and an item representation storing unit 108.

The target estimation device 100 is divided into, for example, the input unit 101 and a main body of the target estimation device including constituent elements other than the input unit 101. The main body is included in an operated apparatus. Furthermore, the input unit 101 is configured as a terminal (hereinafter referred to as a remote control) that remotely controls, for example, the operated apparatus and the main body.

The input-output control unit 109 controls the constituent elements of the main body based on a signal inputted by the input unit 101.

The input unit 101 accepts input from the user. Furthermore, the input unit 101 includes: an item input unit 102 that accepts an item that is selected by an operation of the user, on a menu; and a support request input unit 115 that accepts a support request from the user. The support request input unit 115 serves as an estimation instructing unit, and accepts a support request when the user selects a help button on the remote control, or a "?" button displayed on the output unit 103. Then, the input unit 101 transmits, to the input-output control unit 109, the accepted item, and an input signal 121 indicating the accepted support request. Here, the item input unit 102 serves as an item obtaining unit in the first embodiment.

The output unit 103 obtains an output signal 122 from the input-output control unit 109, and presents information indicated by the output signal 122 to the user. Furthermore, the output unit 103 includes an item presenting unit 104 that displays items, and an operation support presenting unit 105 that displays support information. The support information is information for supporting the user for operating an operated apparatus, and is information indicating a function that is targeted by the user and is estimated by the target estimation device 100. In other words, the operation support presenting unit 105 serves as a presenting unit in the first embodiment.

A function representation storing unit 107 serves as a function storing unit, and stores names representing respective functions included in the operated apparatus by dividing each name into constituent elements (words). Furthermore, information stored in the function representation storing unit 107 is outputted to the input-output control unit 109 as a function representation signal 124.

The item representation storing unit 108 stores all items presented on the item presenting unit 104 by dividing each item into constituent elements (words). Furthermore, information stored in the item representation storing unit 108 is outputted to the input-output control unit 109 as an item representation signal 125.

The device control unit 110 controls an operated apparatus (for example, a DVD recorder). The device control unit 110 obtains a device control signal 126 from the input-output control unit 109. Then, the device control unit 110 controls the operated apparatus, according to a function represented by the device control signal 126. In other words, the input-output control unit 109 specifies a function executed by the operated apparatus based on the input signal 121 obtained from the input unit 101, and outputs, to the device control unit 110, the device control signal 126 indicating the function.

The word concept storing unit 114 stores information defining similarities among words. Such information is generated using a method, for example, latent semantic analysis (LSA), and is outputted to an operation intention calculating unit 117 as a word-to-word similarity definition signal 132. In other words, the word-to-word similarity definition signal 132 indicates vectors representing words, respectively. Then, a similarity between two words are defined, using vectors of the two words. Here, LSA is made based on, for example, a manual of the operated apparatus, and text information obtained from a related website (World Wide Web).

The calculating unit 113 calculates an intention of the user who has operated the operated apparatus and has selected, for each of all of the functions included in the operated apparatus, an item indicated by the first calculation object signal 130, as a degree of the intention for an operation, using the first calculation object signal 130 outputted from the input-output control unit 109 and the word-to-word similarity definition signal 132 outputted from the word concept storing unit 114.

Moreover, when obtaining the input signal 121 indicating an item from the input unit 101, the input-output control unit 109 obtains the function representation signal 124 from the function representation storing unit 107 and the item representation signal 125 from the item representation storing unit 108. Then, the input-output control unit 109 specifies constituent elements of the item that are indicated by the input signal 121, based on the information indicated by the item representation signal 125, and outputs the function representation signal 124 involving the item and the constituent elements, to the calculating unit 113 as the first calculation object signal 130.

Furthermore, the calculating unit 113 includes an identical word detecting unit 116 and the operation intention calculating unit 117.

When receiving the first calculation object signal 130, the identical word detecting unit 116 compares, for each of functions, the item indicated by the first calculation object signal 130 and a function name of a function indicated by the first calculation object signal 130. In other words, the identical word detecting unit 116 detects, for each of function names, a category of a constituent element (operation object or operation action) that matches between the respective function names and the item. Then, the identical word detecting unit 116 outputs the first calculation object signal 130 including a result of the detection to the operation intention calculating unit 117 as a second calculation object signal 133.

When obtaining the second calculation object signal 133, the operation intention calculating unit 117 calculates an operation intention degree for each function of an item indicated by the second calculation object signal 133. In this case, the operation intention calculating unit 117 calculates a similarity between each of the functions and the item as an operation intention degree using the vector indicated by the word-to-word similarity definition signal 132, for each of the functions.

Furthermore, the operation intention calculating unit 117 in the first embodiment serves an operation intention calculating unit. It changes methods for calculating operation intention degrees for each function according to a result of the detection that is performed in the identical word detecting unit 116 and that is indicated by the second calculation object signal 133.

Then, the operation intention calculating unit 117 outputs, to the input-output control unit 109, the calculated operation intention degree as the operation intention signal 131.

The operation intention history memory 106 serves as an intention memory, and obtains and stores the operation intention signal 131 outputted from the calculating unit 113 via the input-output control unit 109. In other words, the input-output control unit 109 serves as an intention storing unit in the first embodiment. Then, the input-output control unit 109 reads information stored in the operation intention history memory 106 as an operation intention history signal 123.

The target estimation unit 112 serves as an estimation unit. It receives, from the input-output control unit 109, a target estimation object signal 129 indicating information stored in the operation intention history memory 106, estimates a function targeted by the user from operation histories, and outputs a result of the estimation as a target estimation result signal 134.

The operation support deciding unit 111 receives the result estimated by the target estimation unit 112 via the input-output control unit 109 as the operation support object signal 128, decides a method for supporting an operation, and outputs an operation support signal 127 for supporting the operation.

Figure 3:
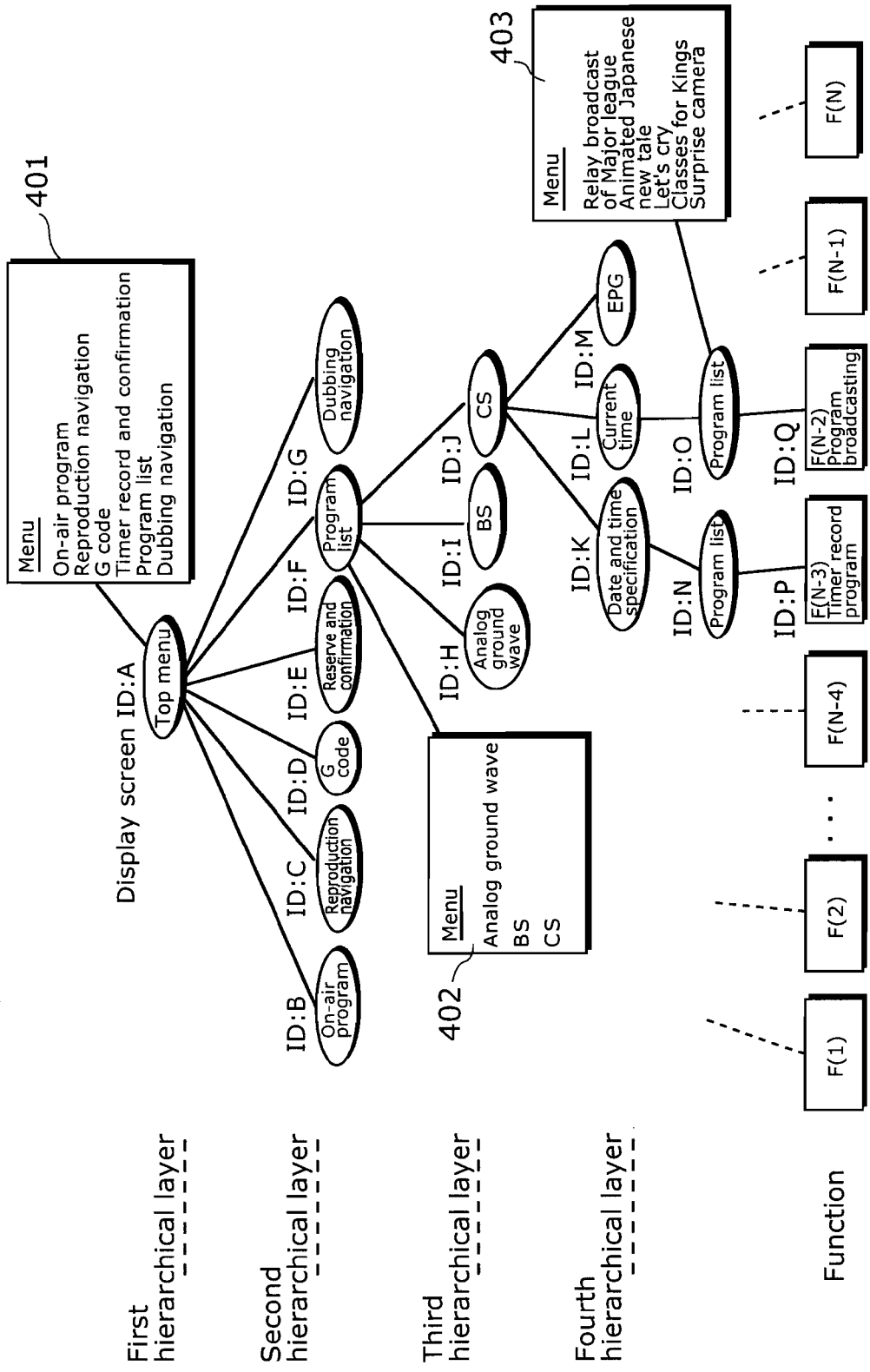
FIG. 3 illustrates items and functions.

FIG. 3 illustrates items and functions.

The operated apparatus is, for example, a DVD recorder including a menu-selection interface.

Generally, apparatuses, such as a DVD recorder and a television have menus hierarchically structured. Selecting menus (items) to be displayed on a screen in sequential order by descending in the hierarchy enables the user to reach a desired function. Here, menus are made up of items.

As illustrated in FIG. 3, the input-output control unit 109 uses menu information that is of the operated apparatus and is arranged in a tree structure (hierarchy) for managing current states of the user. This menu information illustrates nodes corresponding to menus arranged in the tree structure, and display screen IDs for identifying display screens corresponding to each of the nodes. For example, a node named "Top menu" in the first hierarchical layer is selected first when an operation is started, and a screen display corresponding to an ID of "A", in other words, a top menu 401 is displayed after the selection. Assume that the user selects "Program list" from among the menus (items) displayed on the top menu 401, a node named "Program list" in the second hierarchical layer is selected, and a screen display corresponding to an ID of "F", in other words, a top menu 402 is displayed.

In other words, the item presenting unit 104 first displays the top menu 401 indicating "On-air program, reproduction navigation, G code", etc, in the first hierarchical layer. The item input unit 102 outputs, to the input-output control unit 109, an item selected by an operation of the user, for example, the input signal 121 indicating "Program list". When obtaining the input signal 121, the input-output control unit 109 identifies a node corresponding to the item "Program list" indicated by the input signal 121, in the second hierarchical layer. Then, the input-output control unit 109 causes the item presenting unit 104 to display the top menu 402 indicating "Analog ground wave, BS, CS" corresponding the node in the second hierarchical layer. Then, the item input unit 102 outputs, to the input-output control unit 109, an item selected by an operation of the user, for example, the input signal 121 indicating "CS". Thus, selection of items in sequential order enables the user to narrow down functions to be executed by the operated apparatus and to finally identify one function from among functions F(1) to F(N) of the operated apparatus.

Figure 4:
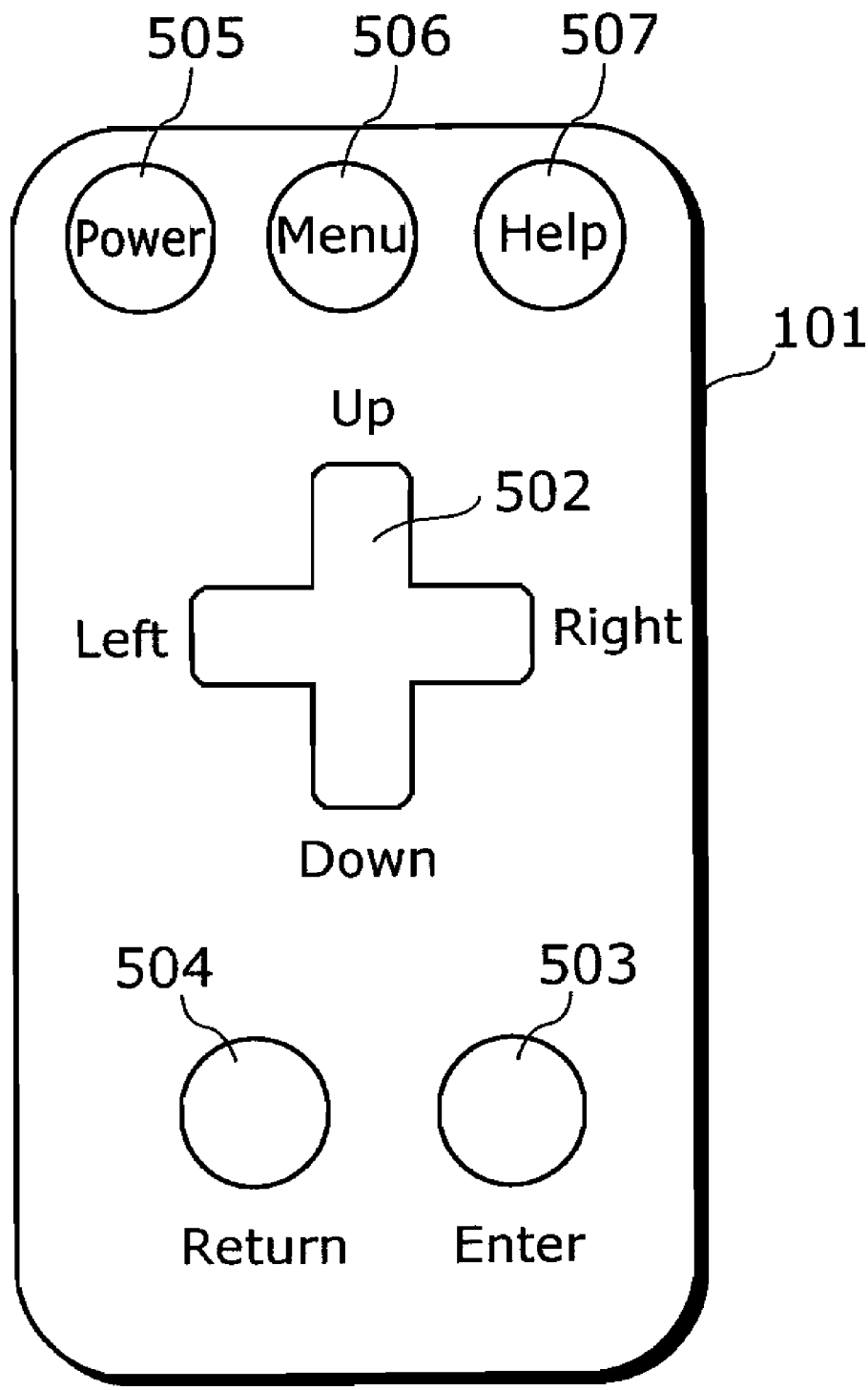
FIG. 4 illustrates an outward view of the input unit 101.

FIG. 4 illustrates an outward view of the input unit 101.

The input unit 101 is configured as a remote control as described above, and includes: the item input unit 102 including a menu button 506, a cursor key 502, a return button 504, and an enter button 503; and the support request input unit 1151 including a help button 507. Furthermore, the input unit 101 includes a power button 505.

In other words, the user presses the power button 505 of the input unit 101 illustrated in FIG. 4 to turn on the operated apparatus. Then, the user presses down the menu button 506, and displays the top menu 401 as illustrated in FIG. 3. Then, the user moves the cursor to a desired menu (item) in the top menu 401, using the cursor key 502 of the input unit 101 illustrated in FIG. 4, and presses the enter button 503. As a result, a node to be displayed in the menu information is moved to a lower layer, and a display screen to be displayed is changed to the next.

For example, after the top menu 401 illustrated in FIG. 3 is displayed, the user presses down the cursor key 502 four times, puts the cursor on one of the items, "Program list", and presses the enter button 503. As a result, the monitor displays the menu 402 defined in a node "Program list" in the second hierarchical layer of the menu information illustrated in FIG. 3. Furthermore, when the user presses the return button 504, a node to be displayed in the menu information is moved up by one upper layer, and the top menu 401 defined by the node "Top menu" in the first hierarchical layer is again displayed.

Furthermore, when the user desires to view a program from among CS programs currently being broadcasted, the user changes menus to be displayed, from "Top menu", "Program list", "CS", "Current time", to "Program list" in sequential order by performing operations in the same manner. As a result, the monitor displays the menu 403 indicating a list of the CS programs currently being broadcasted. The user can view a desired program by selecting an item from the menu "Program list".

FIG. 5 illustrates information stored in the item representation storing unit 108.

The item representation storing unit 108 stores an item representation database 601 illustrated in FIG. 5. The item representation database 601 indicates item names, operation objects, operation actions, and peripheral information. The item names are language labels representing the items. Here, an "item" in the first embodiment mainly refers to an item name. When an item name is represented by an object A and an action B, an operation object corresponds to the object A, and an operation action corresponds to the action B. Here, such operation object and operation action are generated by performing a morphological analysis on representation of an item name. The peripheral information does not belong to any operation objects and operation actions from among morphemes of an item represented by an object and an action, and excludes particles and auxiliary verbs.

More specifically, when an item name "title deletion" is converted to representation of an object and an action, "title deletion" is converted to "delete title". Thus, for the item name "title deletion", the operation object "title" and the operation action "delete" are generated. Furthermore, the item name includes no peripheral information.

In other words, the item representation database 601 indicates item IDs for identifying items, the item names corresponding to the items, operation objects, operation actions, and peripheral information. For example, the item representation database 601 indicates the item name "title deletion", the operation object "title", and the operation action "delete".

The item representation database 601 is outputted to the input-output control unit 109 as the item representation signal 125.

FIG. 6 illustrates information stored in the function representation storing unit 107.

The function representation storing unit 107 stores a function representation database 1701 illustrated in FIG. 6. The function representation database 1701 indicates names each representing a function and constituent elements (words) that composes each of the names for calculating operation intention degrees. In other words, the function representation database 1701 indicates, as the constituent elements, operation objects corresponding to objects included in names, operation actions corresponding to actions, and peripheral information that does not belong to any of the operation objects and operation actions. In such names and constituent elements of these functions are generated, more specifically by using descriptions of a manual that describes each apparatus (function names). In other words, after performing a morphological analysis on a function name (description), an operation object is generated by extracting a morpheme corresponding to an object. Then, after performing a morphological analysis on the function name (description), an operation action is generated by extracting a morpheme corresponding to an action. Furthermore, after performing the morphological analysis on the function name (description), peripheral information is generated by extracting morphemes that do not belong to any of the operation objects and operation actions and that are other than morphemes of particles and auxiliary verbs.

More specifically, when a function name (description) indicates "delete all recorded programs (titles)", the operation objects are "recorded, programs, titles", the operation action is "delete", and the peripheral information is "all".

In other words, the function representation database 1701 indicates function IDs for identifying functions, function names corresponding to the functions, operation objects, operation actions, and peripheral information. For example, the function representation database 1701 indicates a function name "delete all recorded programs (titles)", operation objects "recorded, programs, titles", an operation action "delete", and peripheral information "all" that correspond to an item of a function ID "F(1)".

The item representation database 1701 is outputted to the input-output control unit 109 as the function representation signal 124.

FIG. 7 illustrates information included in the first calculation object signal 130.

The first calculation object signal 130 includes the function representation signal 124, and item information 703 corresponding to an item indicated by the input signal 121. In other words, the first calculation object signal 130 includes a part of information that is stored in the item representation storing unit 108 and that corresponds to the inputted item, and entire information stored in the function representation storing unit 107 in order to calculate operation intention degrees corresponding to each function of an item inputted by the user.

When obtaining the input signal 121, the input-output control unit 109 generates the item information 703 by extracting, from the item representation signal 125 (item representation database 601), information corresponding to an item indicated by the input signal 121. Then, the input-output control unit 109 generates the first calculation object signal 130 by combining the item information 703 with the function representation signal 124.

Here, the item information 703 indicates an item ID of an item indicated by the input signal 121, at least an operation object, an operation action, and peripheral information.

Figure 8:
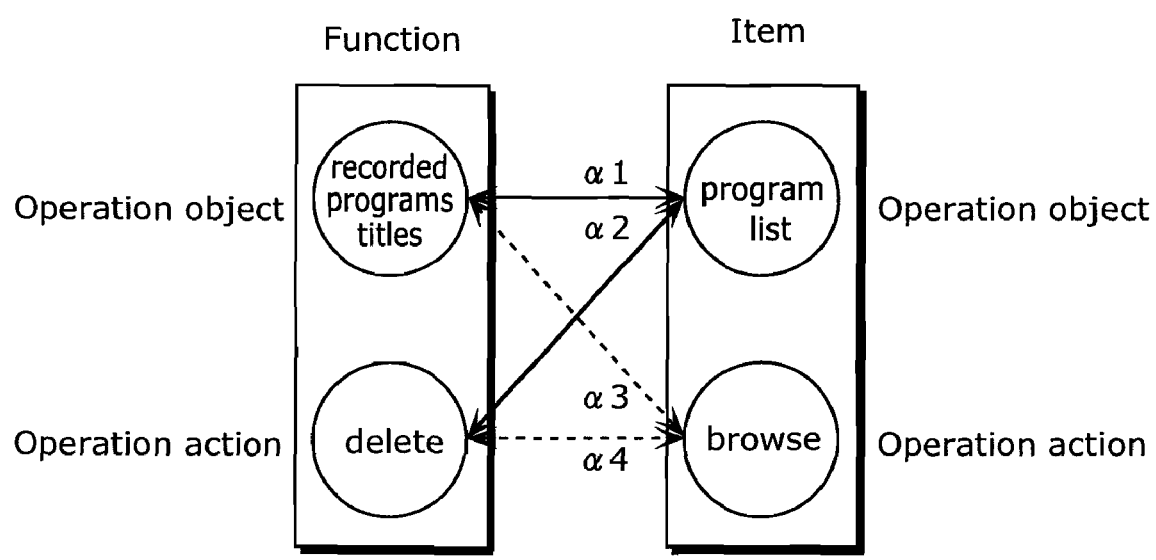
FIG. 8 illustrates a method for calculating an operation intention degree.

Here, operations of the calculating unit 113 in the first embodiment are described using FIG. 8 in detail.

FIG. 8 illustrates a method for calculating an operation intention degree in the first embodiment.

When obtaining the first calculation object signal 130, the calculating unit 113 divides the first calculation object signal 130 into the item information 703 and the function representation signal 124. Then, the calculating unit 113 compares the item information 703 with information of each function indicated by the function representation signal 124. As a result, the calculating unit 113 calculates intentions of the user who has selected an item corresponding to the item information 703, for each of the functions indicated by the function representation signal 124, as operation intention degrees.

More specifically, the identical word detecting unit 116 compares, for each of functions indicated by the function representation signal 124, at least an operation object, and an operation action of an item indicated by the item information 703, respectively with at least an operation object and an operation action of each of the functions. Then, the identical word detecting unit 116 determines whether or not the operation objects of the item and each of the operation objects of the functions include any identical morpheme (word). Furthermore, the identical word detecting unit 116 determines whether or not the operation action of the item and each of the operation actions of the functions include any identical morpheme (word). In other words, the identical word detecting unit 116 identifies categories (operation object or operation action) of the words identical between the item and each of the functions.

As a result, the identical word detecting unit 116 identifies, for each of the functions indicated by the function representation signal 124, a type of a relationship between an item and each of the functions, from among three types, T1, T2, and T3. The type T1 indicates a relationship that at least an identical morpheme is included between an operation object of an item and an operation object of a function for each of the functions. Such a relationship indicates that the user focuses on an operation object. The type T2 indicates a relationship that at least an identical morpheme is included between an operation action of an item and an operation action of a function. Such a relationship indicates that the user focuses on an operation action. The type T3 indicates a relationship that no identical morpheme is included between an operation object of an item and an operation object of a function, and that no identical morpheme is included between an operation action of the item and an operation action of the function, or alternatively indicates a relationship that at least an identical morpheme is included between an operation object of an item and an operation object of a function, and that at least an identical morpheme is included between an operation action of the item and an operation action of the function. Such a relationship indicates that the user's attention is balanced between an operation object and an operation action.

Then, the identical word detecting unit 116 adds a type identified for each of the functions to the first calculation object signal 130, generates the second calculation object signal 133, and outputs it to the operation intention calculating unit 117.

For example, the item information 703 indicates operation objects "program, list" and an operation action "browse" of an item (item ID "Sel(2)"), and the function representation signal 124 indicates operation objects "recorded, programs, titles" and an operation action "delete" of a function (function ID "F(1)"). In such a case, the identical word detecting unit 116 determines that the item and the function have the relationship categorized as the type T1, because they include an identical morpheme "program" between the operation object of the item and the operation object of the function.

In other words, when the user selects the item by assuming the function, the user probably focuses on an operation object of the item "program", is led by the wording "program", following the label following strategy, and selects the item almost irrespective of the operation action "browse".

As such, when the item and the function have a relationship "type T1", it is estimated that the user focuses on an operation object of an item, in other words, the user's attention is on an operation object.

For example, the item information 703 indicates operation objects "program, list" and an operation action "browse" of an item (item ID "Sel(2)"), and the function representation signal 124 indicates an operation object "playlist" and an operation action "browse" of a function (function ID "F(N)"). In such a case, the identical word detecting unit 116 determines that the item and the function have the relationship of the type T2, because they include an identical morpheme "browse" between the operation object of the item and the operation object of the function.

In other words, when the user selects the item by assuming the function, the user probably focuses on an operation action "browse" of the item, is led by the wording "browse", following the label following strategy, and selects the item almost irrespective of the operation objects "program, list".

As such, when the item and the function have a relationship categorized as the type T2, it is estimated that the user focuses on an operation action of an item, in other words, the user's attention is on an operation action.

For example, the item information 703 indicates operation objects "program, list" and an operation action "browse" of an item (item ID "Sel(2)"), and the function representation signal 124 indicates operation objects "clock, time" and an operation action "set" of a function (function ID "F(2)"). In such a case, the identical word detecting unit 116 determines that the item and the function have the relationship categorized as the type T3, because they do not include any identical morpheme between the operation object of the item and the operation object of the function.

In other words, when the user selects the item by assuming the function, the user probably selects the item without focusing attention on the description on an item following the label following strategy. In other words, it can be assumed, based on knowledge of the user, that the user selects an item by estimating that a function "set clock time" is in a lower layer of the item "program list browsing". In such a case, it is difficult to assume a reason why the user performs the operation.

As such, when the item and the function have a relationship categorized as the type T3, it is estimated that the user's attention is balanced between operation objects and operation actions, in other words, no attention is paid by the user.

When obtaining the second calculation object signal 133 from the identical word detecting unit 116, the operation intention calculating unit 117 divides the second calculation object signal 133 into the item information 703, the function representation signal 124, and a type identified for each of the functions.

Then, the operation intention calculating unit 117 calculates an operation intention degree between an item and a function, using at least two similarities from among similarities $\alpha1$ to $\alpha4$ calculated between an operation object and an operation action of an item indicated by the item information 703, and an operation object and an operation action of a function indicated by the function representation signal 124, respectively.

Here, the similarity $\alpha1$ is a similarity between an operation object of an item and an operation object of a function, and the similarity $\alpha2$ is a similarity between an operation object of an item and an operation action of a function. Here, the similarity $\alpha3$ is a similarity between an operation action of an item and an operation object of a function, and the similarity $\alpha4$ is a similarity between an operation action of an item and an operation action of a function.

For example, as illustrated in FIG. 8, the similarity $\alpha1$ indicates how similar operation objects of "recorded, programs, titles" of a function are to operation objects "program, list" of an item. Then, the similarity $\alpha2$ indicates how much acceptable a combination between an operation action of a function "delete" and operation objects of an item "program, list" is as an operation, or how much acceptable a combination between the operation objects "program, list" and an action "delete" is in a context. Similarly, the similarity $\alpha3$ indicates how much acceptable a combination between an operation action of an item "browse" and operation objects of a function "recorded, programs, titles" is as an operation, or how much acceptable a combination between the operation objects "recorded, programs, titles" and an action "browse" is in a context. Then, the similarity $\alpha4$ indicates how similar an operation action of a function "delete" is to an operation action of an item "browse".

In other words, the operation intention calculating unit 117 calculates an operation intention degree of a function corresponding to an item, using the similarity $\alpha1$ between an operation object of an item and an operation object of a function, and the similarity 2 between the operation object of the item and an operation action of the function, when a relationship between the item and the function falls into the type T1. As in the case illustrated in FIG. 8, for example, when the similarity $\alpha3$ is used, another action "browse recorded programs (titles)" leading to a function different from a function "delete recorded programs (titles)" is evaluated. This is the reason why the similarity $\alpha3$ is not used here. Furthermore, assuming that the similarity $\alpha3$ does not focus on "browse", when a similarity between operation actions is low in particular ("delete" and "browse" is conceptually different, thus the similarity becomes low), use of similarity $\alpha4$ may result in negative impact on estimation of a target. Thus, the similarity $\alpha4$ is not used here.

Furthermore, the operation intention calculating unit 117 calculates an operation intention degree between a function and an item, using the similarities $\alpha3$ and 4 between an operation action of an item, and an operation object or an operation action of the function, when a relationship between the item and the function falls into the type T2. Furthermore, the operation intention calculating unit 117 calculates an operation intention degree between a function and an item, using the similarities $\alpha1$ to $\alpha4$ among an operation action and an operation object of the item and an operation object and an operation action of the function, when a relationship between the item and the function falls into the type T3. Thus, the operation intention calculating unit 117 can calculate an operation intention degree according to a label following strategy of the user.

Here, when calculating the similarities $\alpha1$ to $\alpha4$, the operation intention calculating unit 117 uses information stored in the word concept storing unit 114. The word concept storing unit 114 stores many words represented by vectors. In other words, a word "w" stored in the word concept storing unit 114 is represented by a vector LSA (w) on an n-dimension space defined by LSA. Here, the vector LSA (w) is normalized such that the size is equal to 1. Thus, for example, a similarity between a word "wi" and a word "wj" is calculated using Sim (wi, wj)=LSA (wi)×LSA (wj) as a cosine distance being defined in LSA, on a space.

Latent semantic analysis (LSA) is a method for judging a meaning of a word based on similarities in a context by calculating statistical information on collocation of words in various context. In order to obtain collocation of words, a matrix of the collocation between words is made using large-scale text corpuses. Then, LSA can be made by performing singular value decomposition and dimensional compression on the collocation matrix. Using the LSA, a word is represented as a vector that has been dimensionally compressed, on an n-dimension space, and similarities between words can be defined as a distance between vectors. This case shows that similarities between words that are defined as a distance between vectors are similar to semantic similarities recognized by a person. Muneo Kitajima, et al use the result as a model for a users' selection behavior using the GUI (A comprehension-Based Model of Deliberate Search, Human Interface '99, 831-836: Non-Patent Reference 1). Thus, words are represented using the LSA, and an operation intention degree is calculated using a value defined by a distance between the words.

Then, the operation intention calculating unit 117 converts, into each of the vectors, an operation object and an operation action of an item and an operation object and an operation action of a function, using the word concept storing unit 114. Here, the operation objects and operation actions are collectively referred to as comparable object portions. In other words, categories of the comparable object portion include an operation object and an operation action.

For example, when the comparable object portion includes at least one word, the operation intention calculating unit 117 converts the comparable object portion into a vector by reading the vector corresponding to the word, from the word concept storing unit 114. In contrast, when the comparable object portion includes a plurality of words, such as operation objects "recorded, programs, titles", the operation intention calculating unit 117 reads vectors each corresponding to the words, from the word concept storing unit 114. Then, the operation intention calculating unit 117 generates a resultant vector by adding the vectors for each of the words, and normalizes the resultant vector so as to convert the comparable object portion into the normalized vector.

More specifically, when an operation object of a function that is a comparable object portion includes words that are morphemes "w1, w2, . . . , wK", the operation intention calculating unit 117 converts the operation object of the function into a vector LSA (F) on an LSA space, as expressed by Equation 1.

$$LSA(F) = \frac{\sum_{k=1}^{K} LSA(w_k)}{\left|\sum_{k=1}^{K} LSA(w_k)\right|} \quad \text{[Equation 1]}$$

Then, the operation intention calculating unit 117 calculates a similarity between two comparable object portions by calculating a cosine distance of vectors representing these comparable object portions.

When a relationship between an item and a function falls into the type T1, the operation intention calculating unit 117 calculates, as described above, an operation intention degree SC (F(i), Sel(j)) of a function F(i) of the item Sel(j), using the similarities α1 and α2. Hereinafter, an item corresponding to the item ID "Sel(j)" is expressed as the item Sel(j), and a function corresponding to the function ID F(i) is expressed as the function F(i). In this case, the operation intention calculating unit 117 first calculates the similarities α1 and α2 as Equation 2. In Equation 2, an operation object of the item Sel(j) is expressed as So(j), an operation object of the function F(i) is expressed as the function Fo(i), and an operation action of the function F(i) is expressed as the function Fv(i).

$$\alpha 1 = Sim(Fo(i), So(j))$$

$$\alpha 2 = Sim(Fv(i), So(j)) \quad \text{[Equation 2]}$$

Then, the operation intention calculating unit 117 calculates an operation intention degree SC (F(i),Sel(j)) in the type T1 as expressed by Equation 3.

$$SC(F(i), Sel(j)) = (+1 + \alpha 2)/2 \quad \text{[Equation 3]}$$

Furthermore, although the operation intention calculating unit 117 calculates an operation intention degree SC (F(i), Sel(j)), using the similarities α1 and α2 when a relationship between an item and a function falls into the type T1, it may calculate the operation intention degree SC (F(i), Sel(j)) without using the similarities α1 and α2. In this case, the operation intention calculating unit 117 calculates, as an operation intention degree, a similarity (cosine distance) between a vector of the operation object So(j) of an item on the LSA, and a resultant vector, on the LSA, obtained by using the operation object Fo(i) and the operation action Fv(i) of a function.

In other words, the operation intention calculating unit 117 calculates an operation intention degree SC (F(i), Sel(j)) in the type T1 as expressed by Equation 4.

$$SC(F(i), Sel(j)) = Sim(Fo(i) + Fv(i), So(j)) \quad \text{[Equation 4]}$$

Here, "+" in Equation 4 indicates that Fo(i) and Fv(i) are expressed into each vector on a semantic space and then the vectors are added on a vector space. Furthermore, the operation intention degree SC (F(i), Sel(j)) that is calculated in Equation 3 or Equation 4, in the type T1 is hereinafter expressed as Soc (F(i), Sel(j)).

When a relationship between an item and a function falls into the type T2, the operation intention calculating unit 117 calculates an operation intention degree SC (F(i), Sel(j)) between a function F(i) and an item Sel(j), using the similarities α3 and α4. In this case, the operation intention calculating unit 117 calculates the operation intention degree SC (F(i), Sel(j)) in the type T2, as expressed by Equation 5. In Equation 5, an operation action of the item Sel(j) is expressed as Sv(j), an operation object of the function F(i) is expressed as the function Fo(i), and an operation action of the function F(i) is expressed as Fv(i).

$$SC(F(i), Sel(j)) = \frac{(\alpha 3 + \alpha 4)}{2} \quad \text{[Equation 5]}$$

$$= \frac{\left(\begin{array}{c} Sim(Fo(i), Sv(j)) + \\ Sim(Fv(i), Sv(j)) \end{array}\right)}{2}$$

Here, the calculated operation intention degree SC (F(i), Sel(j)) in the type T2 is expressed as Svc(F(i), Sel(j)).

When a relationship between an item and a function falls into the type T3, the operation intention calculating unit 117 calculates an operation intention degree SC (F(i), Sel(j)) between a function F(i) and an item Sel(j), using the similarities α1 to α4 as described above. In this case, the operation intention calculating unit 117 calculates the operation intention degree SC (F(i), Sel(j)) in the type T3, as expressed by Equation 6.

$$SC(F(i), Sel(j)) = (\alpha 1 + \alpha 2 + \alpha 3 + \alpha 4)/4 \quad \text{[Equation 6]}$$

As such, the operation intention calculating unit 117 in the first embodiment calculates an operation intention degree SC (F(i), Sel(j)), using the similarities α1 to α4 when a relationship between an item and a function falls into the type T3, without assigning weight to any of morphemes of items and functions.

Furthermore, when a relationship between an item and a function falls into the type T3, the operation intention calculating unit 117 may calculate an operation intention degree SC (F(i), Sel(j)) without using the similarities α1 to α4. In this case, the operation intention calculating unit 117 calculates, as an operation intention degree, a similarity (cosine distance) between a resultant vector, on the LSA, obtained by using the operation object Fo(i) and the operation action Fv(i) of a function, and a resultant vector, on the LSA, obtained by using an operation object So(i) and the operation action Sv(i) of an item.

In other words, as expressed by Equation 7, the operation intention calculating unit 117 calculates an operation intention degree SC (F(i), Sel(j)) in the type T3 by adding, in advance, morphemes of an operation object and an operation action that are made up of a function and an item, similarly as Bag-Of-Words for normal use in an information search field, etc.

$$SC(F(i), Sel(j)) = Bow(F(i), Sel(j)) \quad \text{[Equation 7]}$$

$$= Sim(Fo(i) + Fv(i), So(j) + Sv(j))$$

Here, the calculated operation intention degree SC (F(i), Sel(j)) in the type T3 is hereinafter expressed as Bow(F(i), Sel(j)).

As such, when calculating operation intention degrees for all functions of items, the operation intention calculating unit 117 outputs the operation intention signal 131 indicating a result of the calculation to the input-output control unit 109.

As such, in the first embodiment, a method for calculating an operation intention degree is changed depending on an element (comparable object portion) that represents a function and that includes a morpheme that is included in an item that has been selected. Thus, a combination of an item and a function for calculating an operation intention degree enables the label following strategy to be included as one of factors for the calculation. The label following strategy indicates a portion of an item where the user focuses on. More specifically, as described above, an operation intention degree is calculated in a different method according to each of the types, T1, T2, and T3. Thus, assuming that the user is to execute a function, an operation intention degree can be calculated for three types: (1) when the user focuses on an operation object of an item; (2) when the user focuses on an operation action of an item; and (3) when the user's attention is balanced between an operation object and an operation object.

Figure 9:
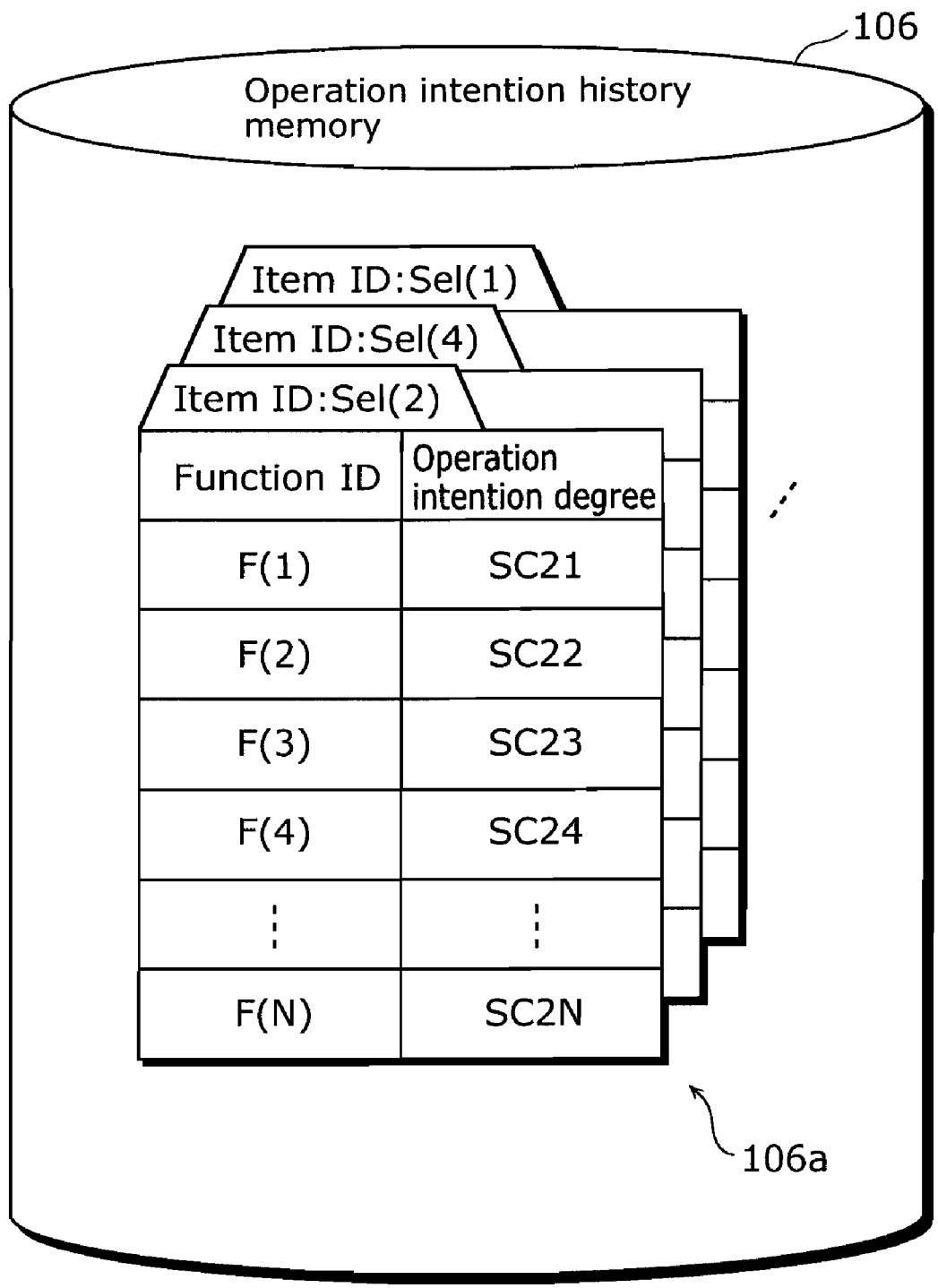
FIG. 9 illustrates information stored in an operation intention history memory.

FIG. 9 illustrates information stored in the operation intention history memory 106.

The input-output control unit 109 obtains and stores an operation intention signal 131 in the operation intention history memory 106, each time the calculating unit 113 outputs the operation intention signal 131. As a result, the operation intention history memory 106 stores history information 106a. This history information 106a stores operation intention degrees of all functions for items selected by the user.

The history information 106a indicates, for example, an operation intention degree "SC21" of the function F(1) and an operation intention degree "SC22" of the function F(2) for the item Sel(2) selected by the user.

The target estimation unit 112 requests the input-output control unit 109 to transmit the history information 106a, when the input unit 101 outputs the input signal 121 indicating a support request to the input-output control unit 109. As a result, the history information 106a stored in the operation intention history memory 106 is read to the input-output control unit 109 as the operation intention history signal 123. Then, the target estimation unit 112 obtains the operation intention history signal 123 from the input-output control unit 109 as the target estimation object signal 129.

When obtaining the target estimation object signal 129, the target estimation unit 112 calculates a score of a function indicated by a function ID by obtaining an average of operation intention degrees that are calculated for each item and that correspond to the function ID. The target estimation unit 112 calculates scores (target estimation scores) for all functions.

In other words, the target estimation unit 112 calculates a score S(i) of the function ID F(i) as expressed by Equation 8. Here, T indicates the number of items selected by the user so far, and Item (t) indicates a n-th item.

$$S(i) = \frac{1}{T}\sum_{t=1}^{T} SC(F(i), \text{Item}(t))$$ [Equation 8]

When calculating all scores of the functions, the target estimation unit 112 outputs a result of the calculation as the target estimation result signal 134.

The operation support deciding unit 111 obtains the target estimation result signal 134 outputted by the target estimation unit 112, as the operation support object signal 128 via the input-output control unit 109. Then, the operation support deciding unit 111 determines a function to be displayed on the operation support presenting unit 105 of the output unit 103, based on the scores for each function indicated by the operation support object signal 128. For example, the operation support deciding unit 111 extracts M-number of functions (function IDs) (M-best) in descending order of the scores from among N-number of functions (function IDs). Then, the operation support deciding unit 111 outputs the operation support signal 127 indicating the function IDs corresponding to the extracted M-number of functions, and indicating scores corresponding to the function IDs.

When obtaining the operation support signal 127 outputted from the operation support deciding unit 111, the input-output control unit 109 generates support information using the operation support signal 127 and the function representation signal 124, and outputs the support information to the operation support presenting unit 105 of the output unit 103 as the output signal 122.

FIG. 10 illustrates details of support information.

The input-output control unit 109 identifies a function name corresponding to a function ID indicated by the operation support signal 127, using the function representation signal 124. Then, the input-output control unit 109 generates support information 127a indicating: function IDs indicated by the operation support signal 127, function names each corresponding to a function ID, and scores of each function. Furthermore, the support information 127a indicates function IDs and function names in descending order, from among the M-number of functions determined by the operation support deciding unit 111.

Figure 11:
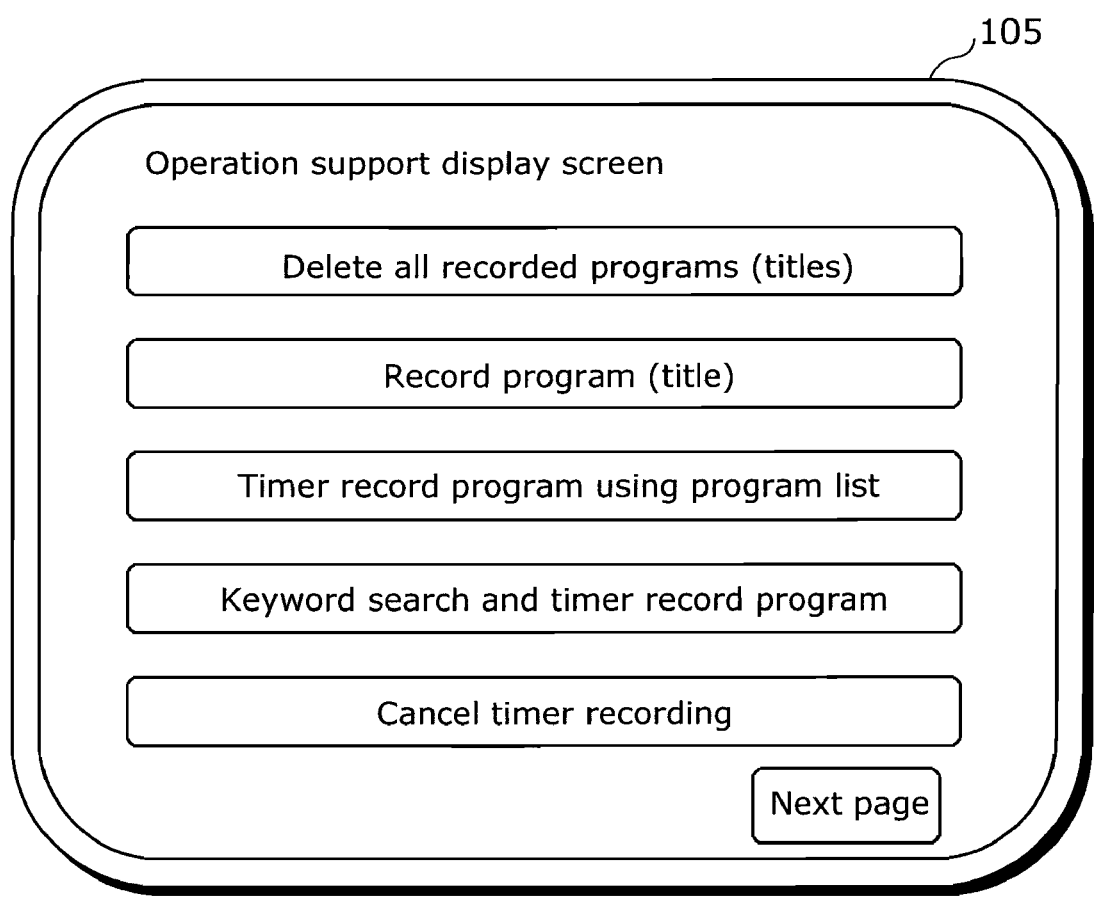
FIG. 11 illustrates a display screen displayed on an operation support presenting unit in an output unit.

FIG. 11 illustrates a display screen displayed on the operation support presenting unit 105 of the output unit 103.

When obtaining the support information 127a (output signal 122), the operation support presenting unit 105 displays the M-number of function names indicated by the support information 127a in the order indicated by the support information 127a.

By selecting the function names displayed in such manner, the user can cause the operated apparatus to execute the function directly without selecting the items in sequential order according to hierarchical structure of the menu information illustrated in FIG. 3.

The M-number of functions (function names) to be displayed on the operation support presenting unit 105 are desirably fit into a single screen without any difficulties, and in such a case, the M-number is, for example, approximately 5. Furthermore, when another M-number of functions are displayed on a scrolled screen, for example, the M-number is desirably 10 approximately. Furthermore, the operation support deciding unit 111 may output the operation support signal 127 indicating a function ID and a score of the function having at least a predetermined threshold. For example, when the threshold is 0.3, support information indicating names and scores for only 4 function IDs, "F(1), F(2), F(3), F(10)" is generated without generating the operation support signal 127a illustrated in FIG. 10. Thus, only the 4 function names are displayed on the operation support presenting unit 105.

Figure 12:
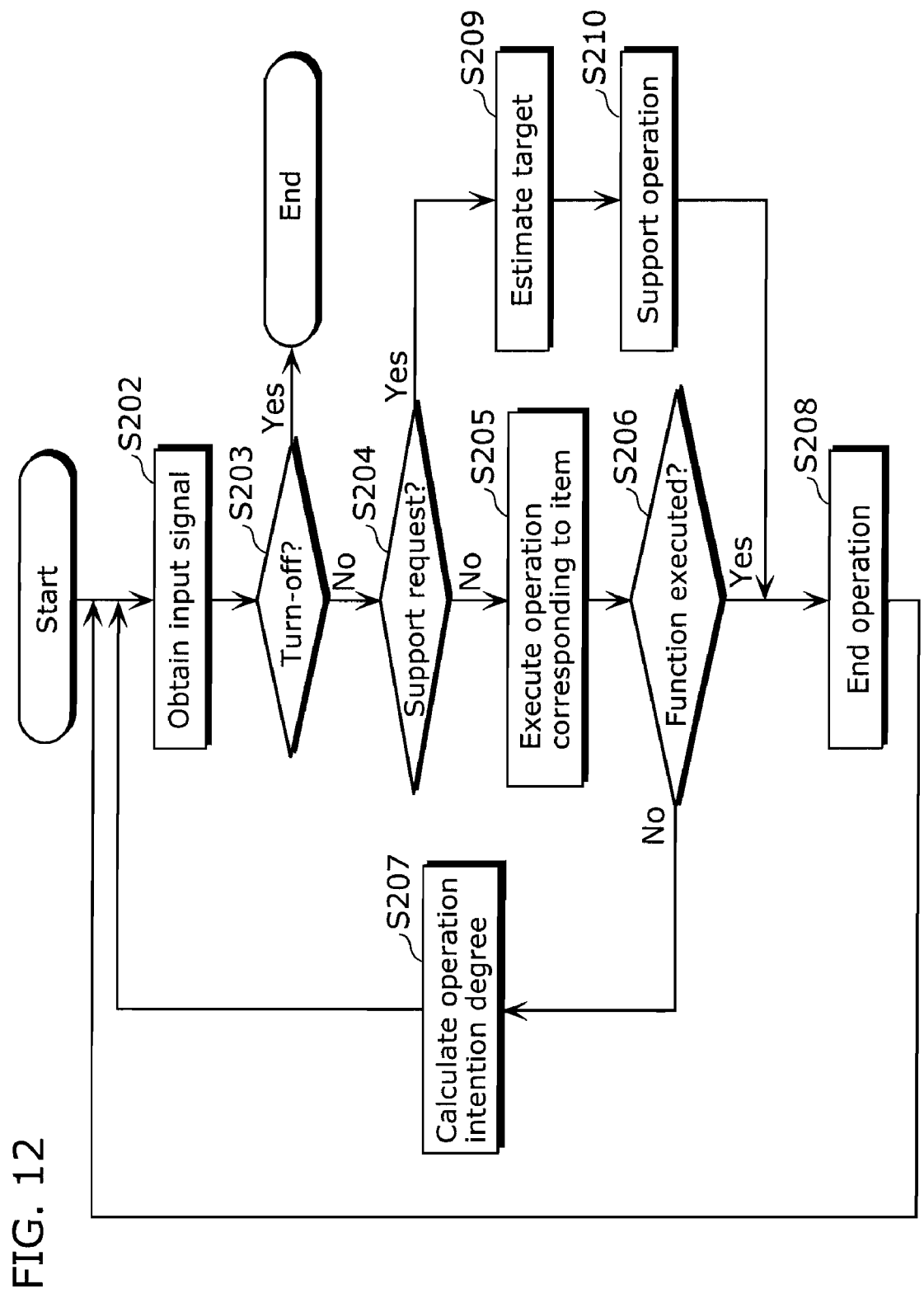
FIG. 12 is a flowchart showing processing of the target estimation device.

FIG. 12 is a flowchart showing processing of the target estimation device 100 of the first embodiment.

First, the input-output control unit 109 of the target estimation device 100 obtains the input signal 121 from the input unit 101 (Step S202). Then, the input-output control unit 109 determines whether or not the input signal 121 indicates turn-off of the operated apparatus (Step S203). In other words, when the user presses the power button 505 of the input unit 101 in a state where the operated apparatus is on, the input-output control unit 109 obtains the input signal 121 corresponding to the operation of the user from the input unit 101. In this case, the input-output control unit 109 determines that the input signal 121 indicates turn-off of the operated apparatus.

Here, when the input-output control unit 109 determines that the input signal 121 indicates turn-off of the operated apparatus (Yes in Step S203), all operations end. Here, when the input-output control unit 109 determines that the input signal 121 does not indicate turn-off of the operated apparatus (No in Step S203), the input-output control unit 109 further determines whether or not the input signal 121 indicates a support request (Step S204). In other words, when the user presses the help button 507 of the input unit 101, the input-output control unit 109 obtains the input signal 121 corresponding to the operation of the user from the input unit 101. In this case, the input-output control unit 109 determines that the input signal 121 indicates a support request. Furthermore, when the user presses the menu button 506 of the input unit 101, or when the user puts the cursor on a desirable item by pressing the cursor key 502 or the return button 504, and presses the enter button 503, the input-output control unit 109 obtains the input signal 121 corresponding to the operation of the user from the input unit 101. In this case, the input-output control unit 109 determines that the input signal 121 indicates the item.

Here, when determining that the input signal 121 does not request any support (No in Step S204), in other words, when determining that the input signal 121 indicates an item, the input-output control unit 109 executes an operation corresponding to the item (Step S205). For example, when the user presses the menu button 506, the input-output control unit 109 obtains the input signal 121 corresponding to the operation of the user from the input unit 101. In this case, the input-output control unit 109 determines that the input signal 121 indicates the item "Top menu" corresponding to a node in the first hierarchical layer in the menu information. Then, the input-output control unit 109 executes an operation corresponding to the item, in other words, an operation of displaying the top menu 401. Furthermore, when the user presses the cursor key 502 and the enter button 503, and selects the item "Program list" indicated in the top menu 401, the input-output control unit 109 obtains the input signal corresponding to an operation of the user from the input unit 101. In this case, the input-output control unit 109 determines that the input signal 121 indicates the item "Program list" corresponding to a node in the second hierarchical layer in the menu information. Then, the input-output control unit 109 executes an operation corresponding to the item, in other words, an operation of displaying the menu 402.

Furthermore, when the user presses the cursor key 502 and the enter button 503, and selects the item "Relay broadcast of major league" that is indicated in the menu 403 and that is directly associated with a function, the input-output control unit 109 obtains the input signal 121 corresponding to an operation of the user from the input unit 101. In this case, the input-output control unit 109 determines that the input signal 121 indicates the item "Relay broadcast of major league" that is directly associated with a function. Then, the input-output control unit 109 causes the operated apparatus to execute an operation corresponding to the item, in other words, to execute a function of displaying a program "Relay broadcast of major league". In other words, the input-output control unit 109 outputs, to the device control unit 110, the device control signal 126 indicating display of the program "Relay broadcast of major league".

Next, the input-output control unit 109 determines whether or not the function is executed in Step S205 (Step S206). Here, when determining that the function is not executed (No in Step S206), the input-output control unit 109 causes the calculating unit 113 to calculate an operation intention degree of each function corresponding to the item indicated by the input signal 121 (Step S207). In contrast, when determining that the function has been executed (Yes in Step S206), the input-output control unit 109 ends processing, such as deleting the history information 106a stored in the operation intention history memory 106 (Step S208).

Furthermore, when determining that the input signal 121 indicates a support request in Step S204 (Yes in Step S204), the input-output control unit 109 reads the history information 106a stored in the operation intention history memory 106 and causes the target estimation unit 112 to estimate a function targeted by the user (Step S209). In other words, the target estimation unit 112 calculates scores for each of the functions. Then, the input-output control unit 109 causes the operation support presenting unit 105 to display function names having scores in descending order of the scores for executing the operation support (Step S210). Then, the input-output control unit 109 ends the processing (Step S208).

The input-output control unit 109 restarts the processing from Step S202, when the operation intention degree is calculated in Step S207 or when the processing ends in Step S208.

Figure 13:
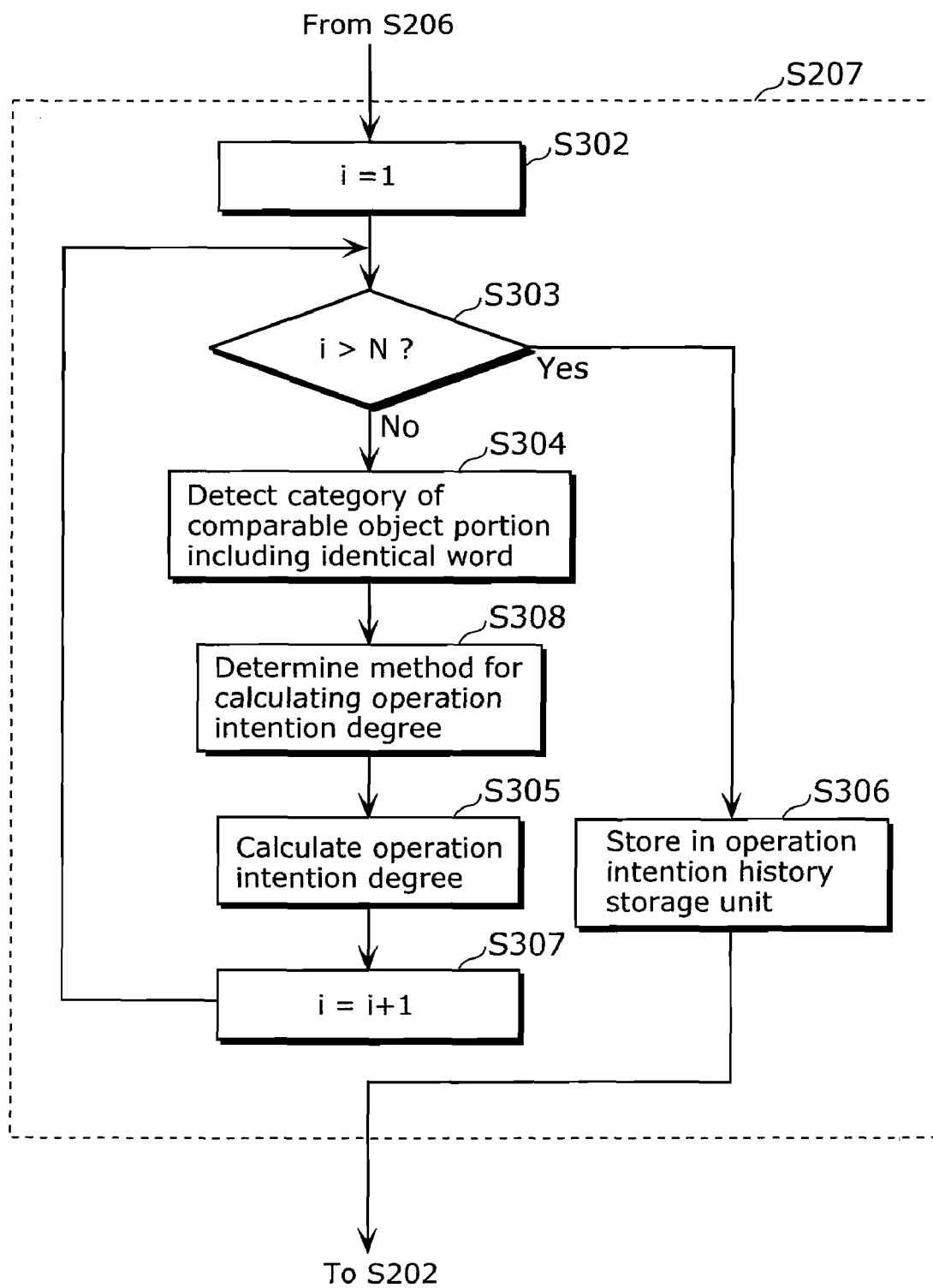
FIG. 13 is a flowchart showing processing of a calculating unit for calculating an operation intention degree.

FIG. 13 is a flowchart showing processing in the calculating unit 113 for calculating an operation intention degree. In other words, FIG. 13 shows detailed processing of Step S207 shown in FIG. 12.

When the input-output control unit 109 instructs the calculating unit 113 to obtain the first calculation object signal 130 and to calculate an operation intention degree, the calculating unit 113 sets a counter value "i" to be an initial value "1" (Step S302). Then, the calculating unit 113 determines whether or not the counter value "i" is larger than N that is the number of functions (function IDs) indicated in the function representation database 1701 (Step S303). In other words, the calculating unit 113 determines whether or not operation intention degrees have been calculated for all functions indicated by the function representation database 1701.

Here, when determining that the counter value "i" is equal to or smaller than the number N (No in Step S303), the calculating unit 113 detects a category of a comparable object portion having an identical word between the item and the i-th function (Step S304). For example, when operation objects of an item include a word "program", and operation objects of the i-th function also include a word "program", the calculating unit 113 detects the operation object having an identical word as a category of the comparable object portion.

Next, the calculating unit 113 identifies, based on the category of the comparable object portion detected in Step S304, a category of a relationship between an item and the i-th function from among the type T1 to the type T3, and determines a method for calculating an operation intention degree corresponding to the identified type (Step S308). As a result, the calculating unit 113 calculates the operation intention degree for the i-th function of the item (Step S305).

Then, the calculating unit 113 increments the counter value "i" (Step S307), and repeatedly executes the processing from Step S303.

Furthermore, when determining that the counter value "i" is larger than the number N in Step S303 (Yes in Step S303), in other words, when determining that operation intention degrees for all of the functions have been calculated, the calculating unit 113 outputs the operation intention signal 131 indicating operation intention degrees for the all functions to the input-output control unit 109, and stores the operation intention degrees in the operation intention history memory 106 (Step S306).

Improvement in an estimation rate of a function targeted by the user using the target estimation device 100 in the first embodiment is hereinafter described in details.

For example, assume the following case. When the operated apparatus has only functions corresponding to function IDs "F(1), F(2), F(3), F(N−1), F(N)" in the function representation database 1701 illustrated in FIG. 6, the user selects the item "function selection" corresponding to the item ID "Sel(4)" in the item representation database 601 illustrated in FIG. 5, and then selects the item "program list browsing" corresponding to the item ID "Sel(2)".

In this case, generally, the target of the user is probably a certain operation (function) related to a program or a certain operation (function) related to browsing. Thus, the function targeted by the user is highly likely a function "delete recorded program (title)" corresponding to the function ID "F(1)"; a function "genre search and timer record program" corresponding to the function ID "F(3)"; or a function "browse playlist" corresponding to the function ID "F(N)". Furthermore, the function targeted by the user is less likely other two functions, in other words, a function "set clock time" corresponding to the function ID "F(2)", or a function "configure network connection" corresponding to the function ID "F(N−1)".

Hereinafter, experiments will prove that target estimation scores of the former 3 functions are higher than target estimation scores of the latter 2 functions, using the target estimation device 100 in the first embodiment. An LSA model for use in the experiments has been made by obtaining texts related to DVD recorders via the Internet. The texts have been obtained by crawling linked pages in two steps from among top 100 pages extracted by inputting key words "DVD HDD operation recorder" in a search engine, and deleting information such as tag information. LSA used in the experiments has been obtained by calculating a collocation frequency on a homepage unit basis, performing singular value decomposition on the collocation frequency, and compressing the obtained value to 25 dimensions.

Figure 14:
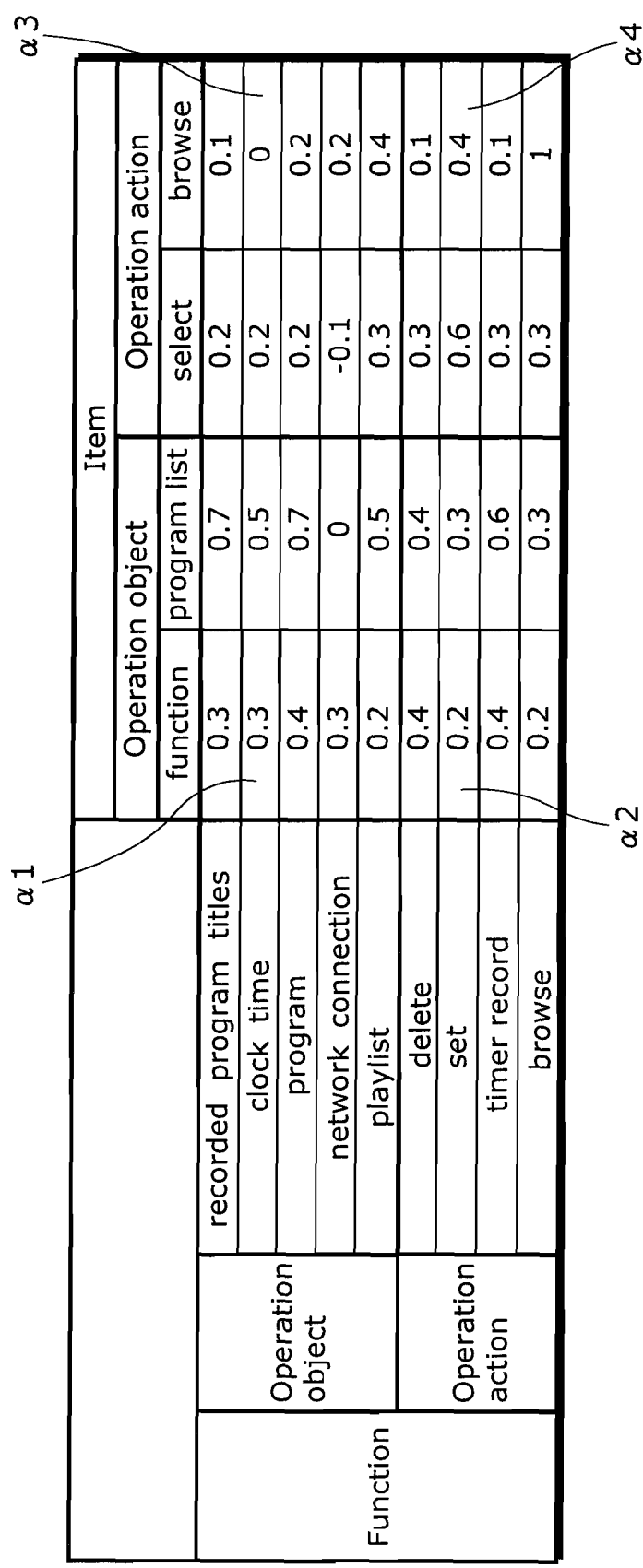
FIG. 14 illustrates similarities α1 to α4 that are calculated in LSA and that are similarities between the items and functions.

FIG. 14 illustrates similarities $\alpha 1$ to $\alpha 4$ that are the similarities between the items and functions and that are calculated in LSA.

According to the LSA, the similarities $\alpha 1$ between an operation object "function" in an item "function selection" and operation objects for functions are calculated as "0.3, 0.3, 0.4, 0.3, 0.2". Furthermore, the similarities $\alpha 1$ between operation objects "program, list" in an item "program list browsing" and operation objects for functions are calculated as "0.7, 0.5, 0.7, 0, 0.5".

The similarities $\alpha 2$ between the operation object "function" in the item "function selection" and operation actions for functions are calculated as "0.4, 0.2, 0.4, 0.2". Furthermore, the similarities $\alpha 2$ between the operation objects "program, list" in the item "program list browsing" and the operation actions for functions are calculated as "0.4, 0.3, 0.6, 0.3".

The similarities $\alpha 3$ between an operation action "select" in the item "function selection" and operation objects for functions are calculated as "0.2, 0.2, 0.2, −0.1, 0.3". Furthermore, the similarities $\alpha 3$ between an operation action "browse" in the item "program list browsing" and the operation objects for functions are calculated as "0.1, 0, 0.2, 0.2, 0.4".

The similarities $\alpha 4$ between an operation action "select" in the item "function selection" and the operation actions for each function are calculated as "0.3, 0.6, 0.3, 0.3". Furthermore, the similarities $\alpha 4$ between the operation action "browse" in the item "program list browsing" and the operation actions for functions are calculated as "0.1, 0.4, 0.1, 1".

FIG. 15 shows, for each function, comparison of scores calculated by the target estimation device 100 in the first embodiment and by a conventional target estimation device, respectively. (a) in FIG. 15 shows the scores calculated by the conventional target estimation device, and (b) in FIG. 15 shows the scores calculated by the target estimation device 100.

As illustrated in (a) of FIG. 15, the conventional target estimation device calculates operation intention degrees of each function for each item using the similarities $\alpha 1$ to $\alpha 4$ without using the label following strategy, in other words, using a method without regard to any user's attention. In other words, the conventional target estimation device calculates an operation intention degree according to an equation, operation intention degree=$(\alpha 1+\alpha 2+\alpha 3+\alpha 4)/4$. For example, an operation intention degree of a function "delete all recorded programs (titles)" for the item "function selection" is calculated as "0.3", and an operation intention degree of a function "delete all recorded programs (titles)" for the item "program list browsing" is also calculated as "0.3".

Then, the conventional target estimation device calculates the scores for each function by calculating an average of operation intention degrees that are calculated between items and the respective functions. For example, the operation intention degrees "0.3, 0.3" of the function "delete all recorded programs (titles)" for the item "function selection" and for the item "program list browsing" are averaged as "0.3".

As a result, the conventional target estimation device estimates that the function "browse playlist" of the function ID "F(N)" is ranked first, the function "genre search and timer record program" of the function ID "F(3)" is ranked second, the function "delete all recorded programs (titles)" and the function "set clock time" of the function IDs "F(1), F(2)" are ranked third, and the function "configure network connection" of the function ID "F(N−1)" is ranked fifth.

Thus, the conventional target estimation device obtains the same scores for the functions F(1) and F(2). Thereby, it is difficult to distinguish between the function F(1) having a high probability of being targeted by the user and the function F(2) having the low probability of being targeted by the user.

In contrast, as illustrated in (b) of FIG. 15, the target estimation device 100 of the first embodiment calculates operation intention degrees of each function for each item using the similarities $\alpha 1$ to $\alpha 4$ according to the label following strategy, in other words, using a method with regard to user's attention. For example, an operation intention degree between a function "delete all recorded programs (titles)" and the item "function selection" is calculated as "0.3", and an operation intention degree between the function "delete all recorded programs (titles)" and the item "program list browsing" is calculated as "0.5".

Then, the target estimation device 100 calculates the scores for each function by calculating an average of operation intention degrees that are calculated between items and the respective functions. For example, the operation intention degrees "0.3, 0.5" between the function "delete all recorded programs (titles)" and the item "function selection" and between the function "delete all recorded programs (titles)" and the item "program list browsing" are averaged as "0.4".

As a result, the target estimation device 100 estimates that the functions "genre search and timer record program" and "browse playlist" of the function IDs "F(3), F(N)" are ranked first, the function "delete all recorded programs (titles)" of the function ID "F(1)" is ranked third, the function "set clock time" of the function ID "F(2)" is ranked fourth, and the function "configure network connection" of the function ID "F(N−1)" is ranked fifth.

Thus, the target estimation device 100 of the first embodiment can estimate that the function ID "F(1)" is more likely to be targeted by the user than the function ID "F(2)", and can appropriately estimate a function that is probably targeted by the user.

FIG. 16 is a drawing for describing that the target estimation device 100 of the first embodiment appropriately estimates a target.

The target estimation device 100 of the first embodiment obtains an average 0.46 of the scores of the functions corresponding to the function IDs "F(1), F(3), F(N)" that are probably functions targeted by the user generally, and obtains an average 0.25 of the scores of the functions corresponding to the function IDs "F(2), F(N−1)". In other words, a difference between the averages is 0.21.

In contrast, the conventional target estimation device obtains an average 0.36 of the scores of the functions corresponding to the function IDs "F(1), F(3), F(N)" that are probably functions targeted by the user generally, and obtains an average 0.25 of the scores of the functions corresponding to the function IDs "F(2), F(N−1)". In other words, a difference between the averages is 0.11.

Thus, the target estimation device of the first embodiment clearly distinguishes between a function to be probably targeted by the user and other functions, enabling appropriate estimation of the function targeted by the user.

Compared to the conventional method of using one operation vector for each item, the target estimation device in the first embodiment can add information indicating a reason why the user performs the operation, thus enabling improvement in an estimation rate of a function and an appropriate operation support based on selection behaviors in the case where the user performs an operation using a part of information of items as a clue.

Second Embodiment

In the case where a target estimation device of the second embodiment detects that the user is confused about selecting an item, even when the user does not press a help button, the target estimation device estimates a function targeted by a user by calculating scores for each function.

Figure 17:
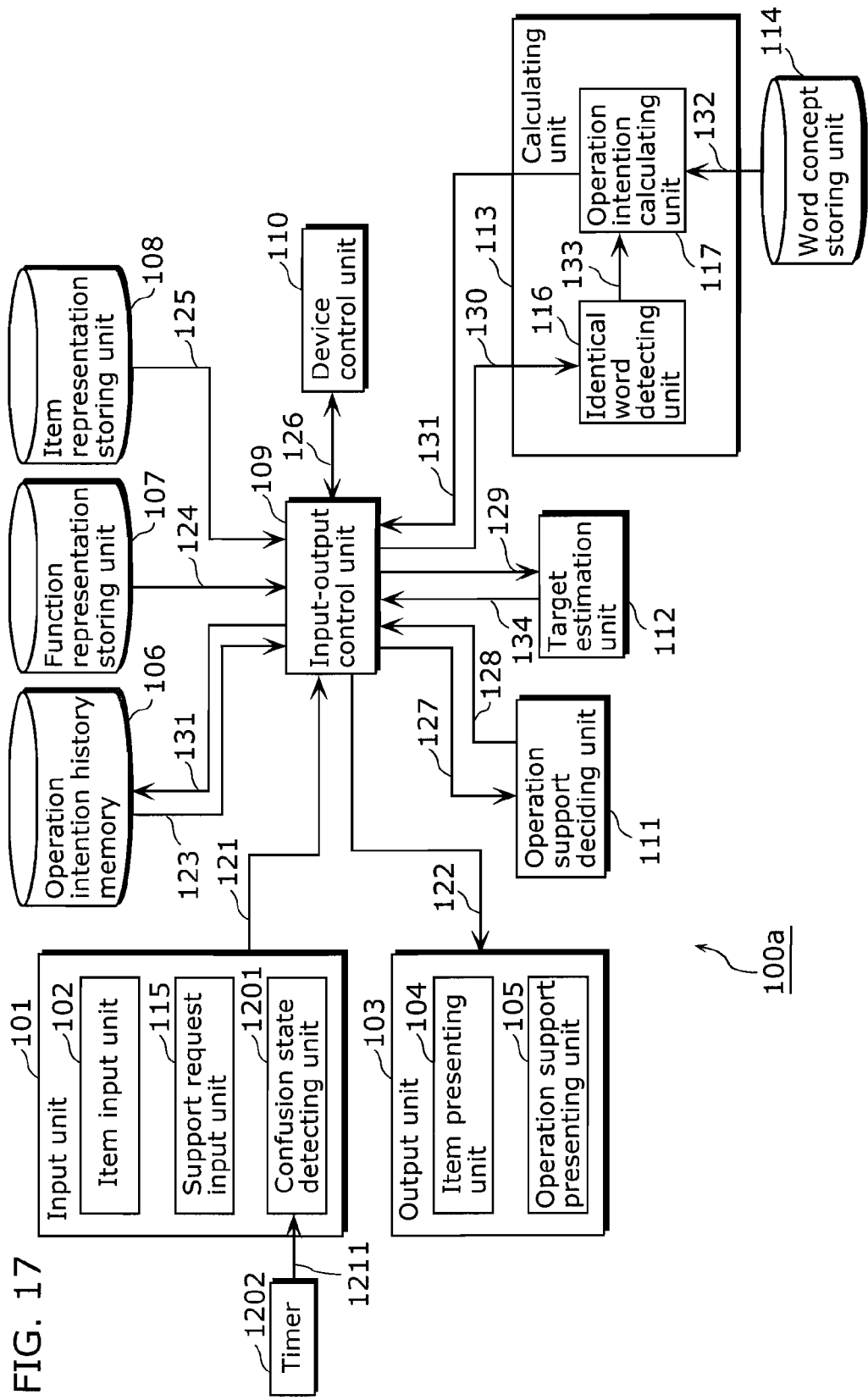
FIG. 17 is a configuration drawing of a target estimation device in the second embodiment of the present invention.

FIG. 17 is a configuration drawing of the target estimation device in the second embodiment.

A target estimation device 100a of the second embodiment additionally includes a confusion state detecting unit 1201 that serves as a confusion detecting unit, and a timer 1202, besides the constituent elements of the target estimation device 100 of the first embodiment. Here, the constituent elements of the target estimation device 100a illustrated in FIG. 17 use the same reference numbers as those of the target estimation device 100 illustrated in FIG. 2, and the detailed description is omitted.

The timer 1202 measures a current time, and outputs an information signal 1211 indicating the current time to the confusion state detecting unit 1201.

The input unit 101a includes an item input unit 102, a support request input unit 115, and further the confusion state detecting unit 1201. The confusion state detecting unit 1201 determines whether or not a state where the user does not select any item is being continued for at least a predetermined time period. When determining that the state is being continued for at least a predetermined time period, the confusion state detecting unit 1201 outputs an input signal 121 indicating a support request to an input-output control unit 109 in the same manner as the support request input unit 115. Here, the confusion state detecting unit 1201 determines that the state has been continued for at least a predetermined time period by obtaining the information signal 1211 and setting the current time indicated by the information signal 1211.

Figure 18:
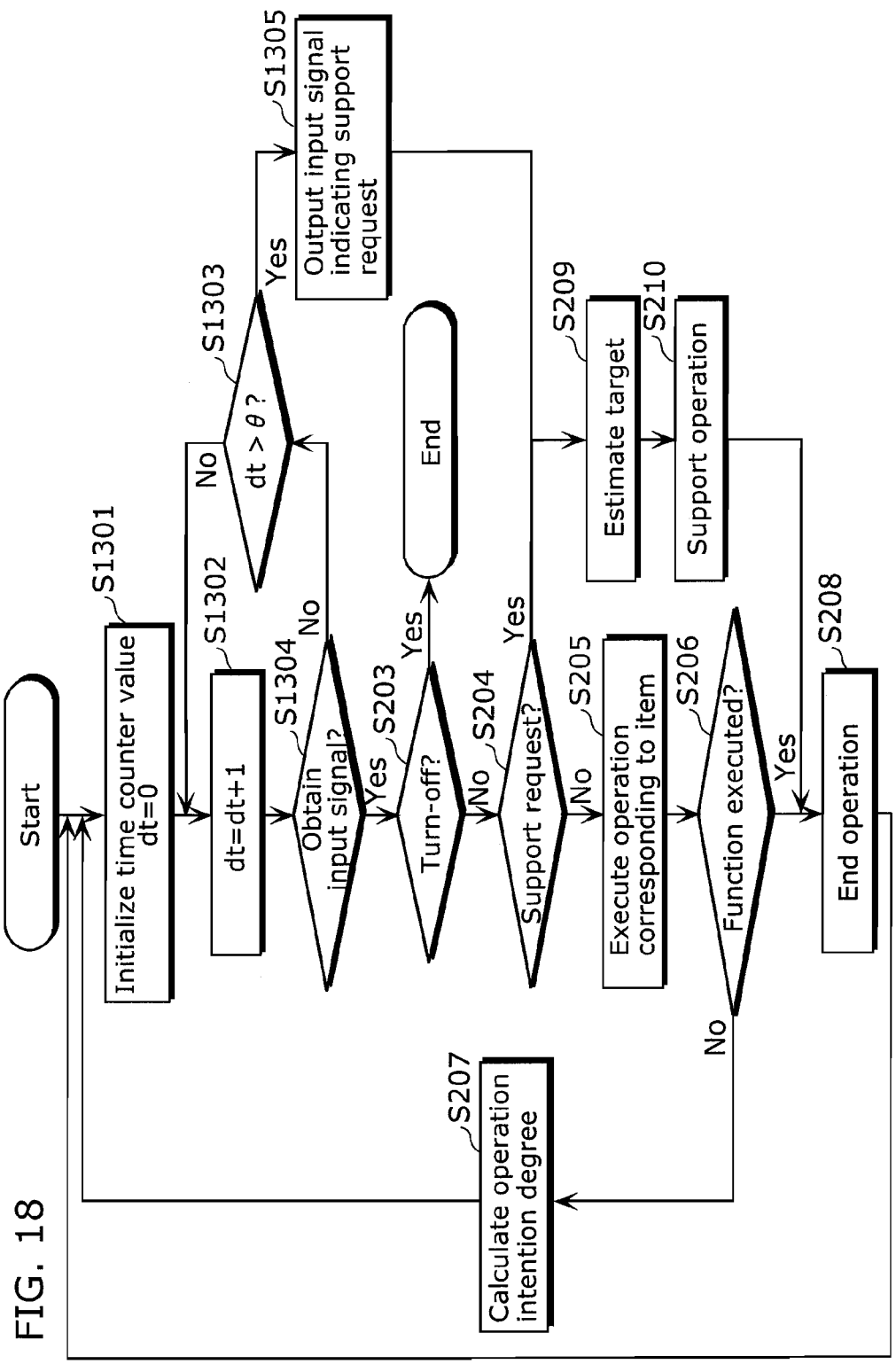
FIG. 18 is a flowchart showing processing in the target estimation device.

FIG. 18 is a flowchart showing processing in the target estimation device 100a of the second embodiment.

First, the confusion state detecting unit 1201 of the target estimation device 100a initializes a time counter value dt to be 0 (Step S1301). Then, the confusion state detecting unit 1201 increments the counter value dt to be updated after a unit time passes (Step S1302). Furthermore, the confusion state detecting unit 1201 determines whether or not the input-output control unit 109 obtains the input signal 121 during the unit time (Step S1304).

Here, when determining that the input-output control unit 109 does not obtain the input signal 121 (No in Step S1304), the confusion state detecting unit 1201 further determines whether or not the time counter value dt is larger than a threshold θ (Step S1303). Here, when determining that the time counter value dt is larger than the threshold θ (Yes in Step S1303), the confusion state detecting unit 1201 outputs the input signal 121 indicating a support request to the input-output control unit 109 (Step S1305).

Here, when determining that the time counter value dt is equal to or smaller than the threshold θ (No in Step S1303), the confusion state detecting unit 1201 repeatedly executes the processing from Step S1302. In other words, when the unit time has passed since updating of the immediately previous counter value dt, in Step S1302, the confusion state detecting unit 1201 further increments the counter value dt to be updated.

Furthermore, after the confusion state detecting unit 1201 outputs the input signal 121 indicating a support request in Step S1305, the target estimation device 100a of the second embodiment estimates a function targeted by the user (Step S209). Furthermore, after the confusion state detecting unit 1201 determines that the input-output control unit 109 obtains the input signal 121 (Yes in Step S1304), the target estimation device 100a determines whether or not the input signal 121 indicates turn-off of the operated apparatus as in the first embodiment (Step S203).

In other words, the target estimation device 100a of the second embodiment performs the same processing as the target estimation device 100 in the first embodiment after Step S203 and after Step S209. Here, after ending the processing in Step S208 or after calculating an operation intention degree in Step S207, the target estimation device 100a repeatedly executes the processing from Step S1301.

When determining that a state where the user does not select any item is being continued for at least a predetermined time period, judging that the user is confused about selecting an item, the confusion state detecting unit 1201 outputs the input signal 121 indicating a support request to the input-output control unit 109 as in the case where a help button 507 of a support request input unit 115 is pressed. As a result, without pressing the help button 507, the user can cause the target estimation device 100a to estimate a target.

Thus, when the user is confused about selecting an item, the user can execute a function estimated by the target estimation device, without pressing down a help button in the second embodiment. Conventionally, unless the user presses down a help button and asks a question, the user cannot find a function targeted by the user. However, when a user is confused about selecting an item, the second embodiment makes it possible to inform the user of a function estimated by the target estimation device without performing any active operation. Even when a user operates an apparatus for the first time, the target estimation device easily finds a desired function interactively and causes the apparatus to execute the function.

Third Embodiment

A target estimation device according to the third embodiment estimates a function targeted by a user by calculating scores for each function with regard to characteristics for operating an apparatus by the user.

Operation characteristics for each user are different, depending on operation manners previously used and habits of the user. Thus, the third embodiment makes it possible to improve precision of estimation and to appropriately support operations for a user, by estimating a target based on profile information of each user, with regard to the characteristics of the user.

For example, menus to be displayed on an operated apparatus manufactured by a company C includes items primarily focusing on an operation action, such as "reproduce", "set", "timer record", and "edit". In this case, users of the operated apparatus manufactured by the company C tend to focus on elements of an operation action. In contrast, menus displayed on an operated apparatus manufactured by a company B includes items of both operation objects and operation actions, such as "function selection", "reproduction navigation", and "program list browse". Since users of the operated apparatus manufactured by the company C tend to be led to words categorized as the operation action, when the users use the operated apparatus manufactured by the company B, it is advantageous to increase use of the label following strategy for a case where operation actions match (type T2) and to decrease use of the label following strategy for a case where operation objects match (type T1).

In other words, the target estimation device of the third embodiment estimates a function targeted by the user according to one of the types with regard to a potential bias of a judgment of a person.

Figure 19:
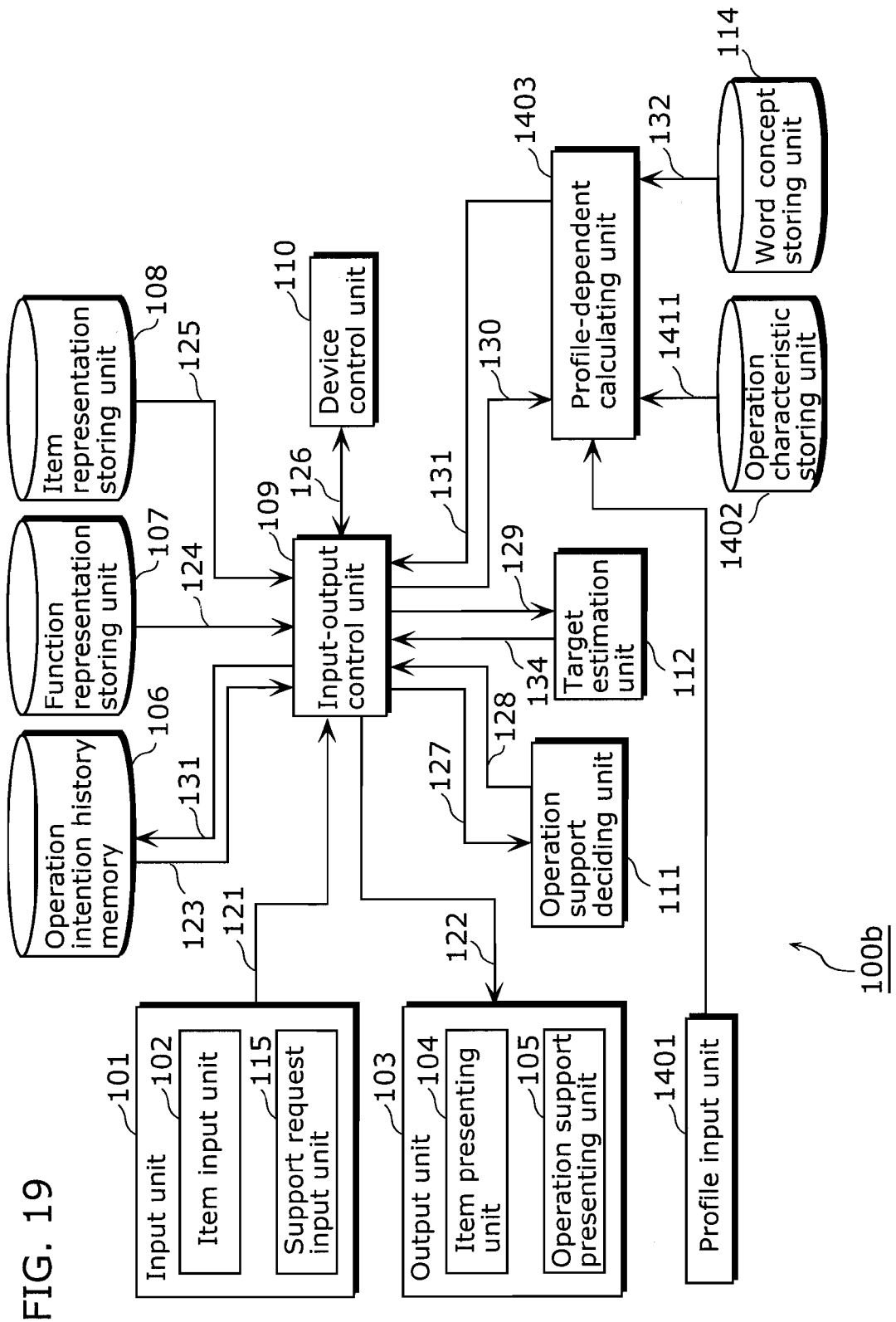
FIG. 19 is a configuration drawing of the target estimation device in the third embodiment of the present invention.

FIG. 19 is a configuration drawing of the target estimation device in the third embodiment.

A target estimation device 100b of the third embodiment includes a profile-dependent calculating unit 1403 instead of the calculating unit 113 of the target estimation device 100 in the first embodiment, and further includes a profile input unit 1401 that serves as a profile information obtaining unit, and an operation characteristic storing unit 1402. Here, the constituent elements of the target estimation device 100b illustrated in FIG. 19 use the same reference numbers as those of the target estimation device 100 illustrated in FIG. 2, and the detailed description is omitted.

The profile input unit 1401 generates profile information of the user according to an operation of the user, and outputs the profile information to the profile-dependent calculating unit 1403. The profile input unit 1401 obtains figures, hiragana and katakana phonetic scripts, and the Roman alphabet, and generates profile information using the obtained figures and the like. Furthermore, the profile input unit 1401 may be included in the input unit 101.

The operation characteristic storing unit 1402 stores operation characteristic information indicating a profile and characteristics of a user who operates an apparatus.

The profile-dependent calculating unit 1403 reads the operation characteristic information stored in the operation characteristic storing unit 1402 as an operation characteristic signal 1411, and calculates an operation intention degree based on the profile information obtained from the profile input unit 1401 and the operation characteristic information.

FIG. 20 illustrates details of profile information.

Profile information 1401a indicates characteristics of a user (profile). More specifically, it indicates a gender of the user, age, use history of an operated apparatus mainly used by the user (for example, DVD recorder), a name of a manufacturer of the operated apparatus, and a model name of the operated apparatus.

For example, the profile information 1401a indicates the gender "male", the age "17", the use history "0.5 year", the manufacturer "company C", and the model name "DV-010".

Here, the profile input unit 1401 may obtain such profile information 1401a from a recording medium storing the profile information in advance, for example, via a network, and through the user interactively.

FIG. 21 illustrates details of operation characteristic information 1402a.

The operation characteristic information 1402a indicates, for each profile of the user, weight Wa of an operation object and weight Wb of an operation action that correspond to the profile.

For example, when the profile indicates the gender "male", the age "17", the use history of the operated apparatus mainly used by the user "0.5 year", and the manufacturer of the operated apparatus "company C", the operation characteristic information 1402a indicates weight Wa=0.2 of the operation object and weight Wb=1.0 of the operation action.

In this case, because menus of the operated apparatus of the company C assign more weight to operation actions, operation object tendency indicating more weight to operation objects measures 0.2, and operation action tendency indicating more weight to operation actions measures 1.0. Here, when description of a function to be executed and the operation action match, the operation action tendency represents tendency of a user who operates an apparatus by focusing more attention on an operation action. The above case (Wb=1.0) shows that the user certainly uses the operation action as a clue. In contrast, the operation object tendency represents tendency of a user who operates an apparatus by focusing more attention on an operation object, when description of a function to be executed and the operation object match.

Figure 22:
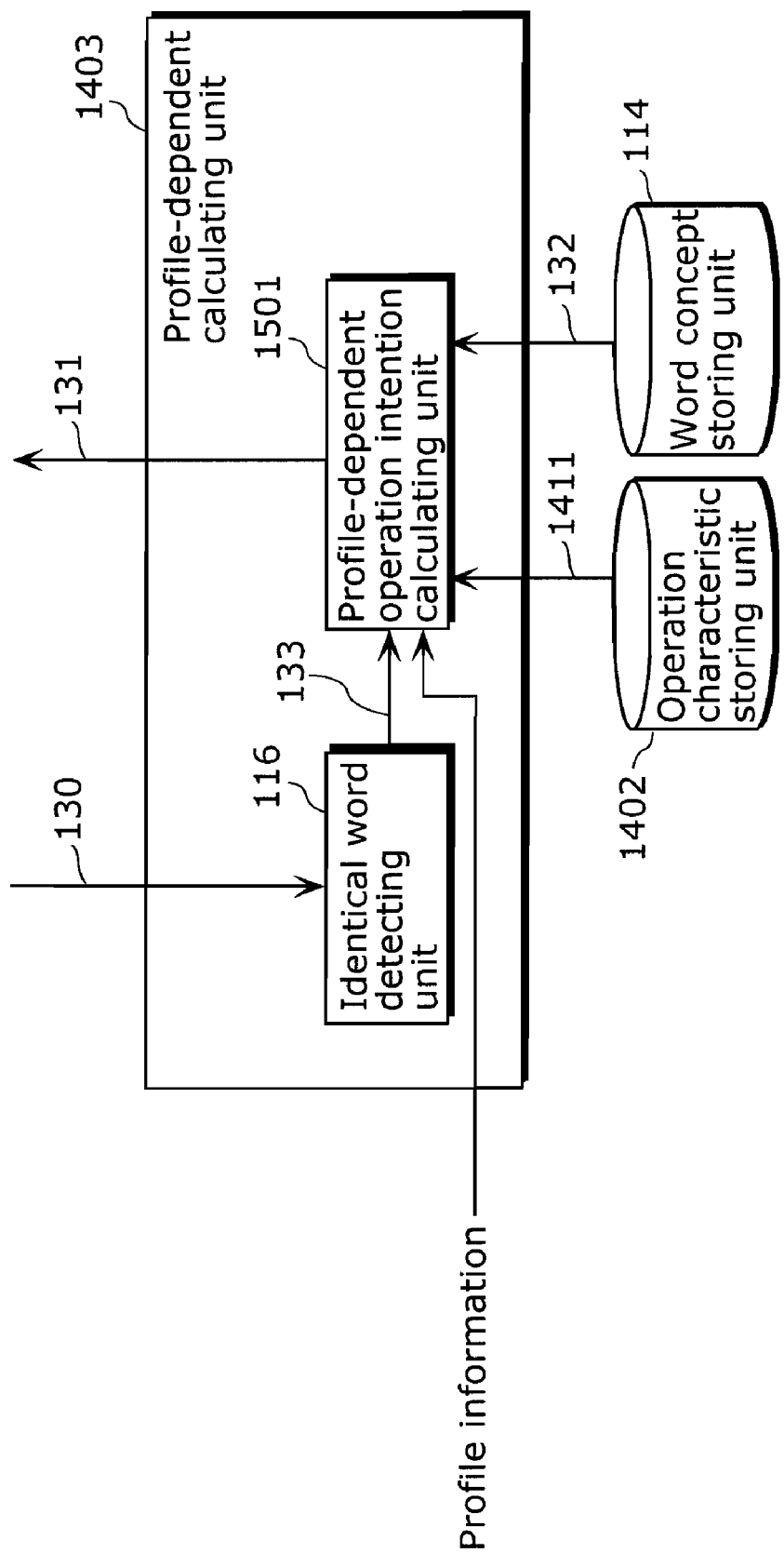
FIG. 22 is a configuration drawing of a profile-dependent calculating unit.

FIG. 22 is a configuration drawing of the profile-dependent calculating unit 1403.

The profile-dependent calculating unit 1403 includes an identical word detecting unit 116 and a profile-dependent operation intention calculating unit 1501.

The identical word detecting unit 116 identifies a category of a word identical between an item and a function (function name) for each function as in the first and second embodiments, and identifies a type indicating a relationship between the item and the function from among the types T1, T2, and T3. Then, the identical word detecting unit 116 adds a type identified for each of the functions to the first calculation object signal 130, generates the second calculation object signal 133, and outputs it to the profile-dependent operation intention calculating unit 1501.

When obtaining the second calculation object signal 133 as in the first and second embodiments, the profile-dependent operation intention calculating unit 1501 calculates operation intention degrees for each function of an item indicated by the first calculation object signal 130 included in the second calculation object signal 133.

Furthermore, when obtaining the profile information 1401a, the profile-dependent operation intention calculating unit 1501 in the third embodiment reads the operation characteristic information 1402a (operation characteristic signal 1411) stored in the operation characteristic storing unit 1402, and identifies the weight Wa of the operation object and the weight Wb of the operation action that correspond to the profile indicated by the profile information 1401a.

When a relationship between an item and a function falls into the type T1, the profile-dependent operation intention calculating unit 1501 calculates an operation intention degree SC' ((F(i),Sel(j))) between an item Sel(j) and a function F(i) using the weight Wa of an operation object, Soc(F(i),Sel(j)), and Bow(F(i),Sel(j)) as expressed by Equation 9.

$$SC'(F(i),Sel(j))=Wa\cdot Soc(F(i),Sel(j))+(1-Wa)\cdot Bow(F(i),Sel(j)) \quad \text{[Equation 9]}$$

In case of the type T1, when the user tends to focus on an operation object, in other words, when the weight Wa of the operation object is larger, the operation intention degree is calculated so that Soc(F(i),Sel(j)) more significantly contributes to the calculation. In contrast, when the user hardly tends to focus on an operation object, in other words, when the weight Wa of the operation object is smaller, the operation intention degree is calculated so that Soc(F(i),Sel(j)) more significantly contributes to the calculation.

When a relationship between an item and a function falls into the type T2, the profile-dependent operation intention calculating unit 1501 calculates an operation intention degree SC' ((F(i),Sel(j))) between an item Sel(j) and a function F(i) using the weight Wb of an operation action, Svc(F(i),Sel(j)), and Bow(F(i),Sel(j)) as expressed by Equation 10.

$$SC'(F(i),Sel(j))=Wb\cdot Svc(F(i),Sel(j))+(1-Wb)\cdot Bow(F(i),Sel(j)) \quad \text{[Equation 10]}$$

In case of the type T2, when the user tends to focus on an operation action, in other words, when the weight Wb of the operation action is larger, the operation intention degree is calculated so that Svc(F(i),Sel(j)) more significantly contributes to the calculation. In contrast, when the user hardly tends to focus on an operation action, in other words, when the weight Wb of the operation action is smaller, the operation intention degree is calculated so that Bow(F(i),Sel(j)) more significantly contributes to the calculation.

Furthermore, when a relationship between an item and a function falls into the type T3, the profile-dependent operation intention calculating unit 1501 calculates an operation intention degree SC' ((F(i),Sel(j))) between an item Sel(j) and a function F(i) as in the first and second embodiments as expressed by Equation 11.

$$SC'(F(i),Sel(j))=Bow(F(i),Sel(j)) \quad \text{[Equation 11]}$$

Here, the operation intention degree in the type T3 affects the second term of Equations 9 and 10. In other words, the second term is a term to be affected when the user performs an operation based on a judgment similar to a case where the user does not notice any identical word or where there is no identical word.

More specifically, the profile-dependent operation intention calculating unit 1501 calculates an operation intention degree SC'(F(2),Sel(2)) between the function "delete all recorded programs (titles)" of the function ID F(2) and the item "program list browsing" of the item ID Sel(2). In this case, because an identical word exists between the operation objects, the relationship between the item and the function falls in the type T1. Thus, the profile-dependent operation intention calculating unit 1501 calculates the operation intention degree SC'(F(2),Sel(2)) with regard to the operation characteristics of the user in Soc(F(2),Sel(2)), as expressed by Equation 12.

$$SC'(F(2),Sel(2))=Wa\cdot Soc(F(2),Sel(2))+(1-Wa)\cdot Bow(F(2),Sel(2)) \quad \text{[Equation 12]}$$

More specifically, the profile-dependent operation intention calculating unit 1501 calculates an operation intention degree SC'(F(N),Sel(2)) between the function "browse playlist" of the function ID F(N) and the item "program list browsing" of the item ID Sel(2). In this case, since an identical word exists between the operation actions, the relationship between the item and the function falls in the type T2. Thus, the profile-dependent operation intention calculating unit 1501 calculates the operation intention degree SC'(F(N),Sel(2)) with regard to the operation characteristics of the user in Svc(F(N),Sel(2)), as expressed by Equation 13.

$$SC'(F(N),Sel(2))=Wb\cdot Svc(F(N),Sel(2))+(1-Wb)\cdot Bow(F(N),Sel(2)) \quad \text{[Equation 13]}$$

Accordingly, the third embodiment enables estimation of an target by more reflecting tendency of operations of the user, using the operation characteristics of the user according to a characteristic of a menu displayed on a device used by the user, leading to provision of more appropriate operation support. Here, although the profile used in the third embodiment includes gender, age, use history of a DVD, and a manufacturer of the DVD currently used, use states of various appliances, such as the number of years for using a cellular phone, a model of the cellular phone, a model of a television, and use history of a personal computer may be used as the profile.

Figure 23:
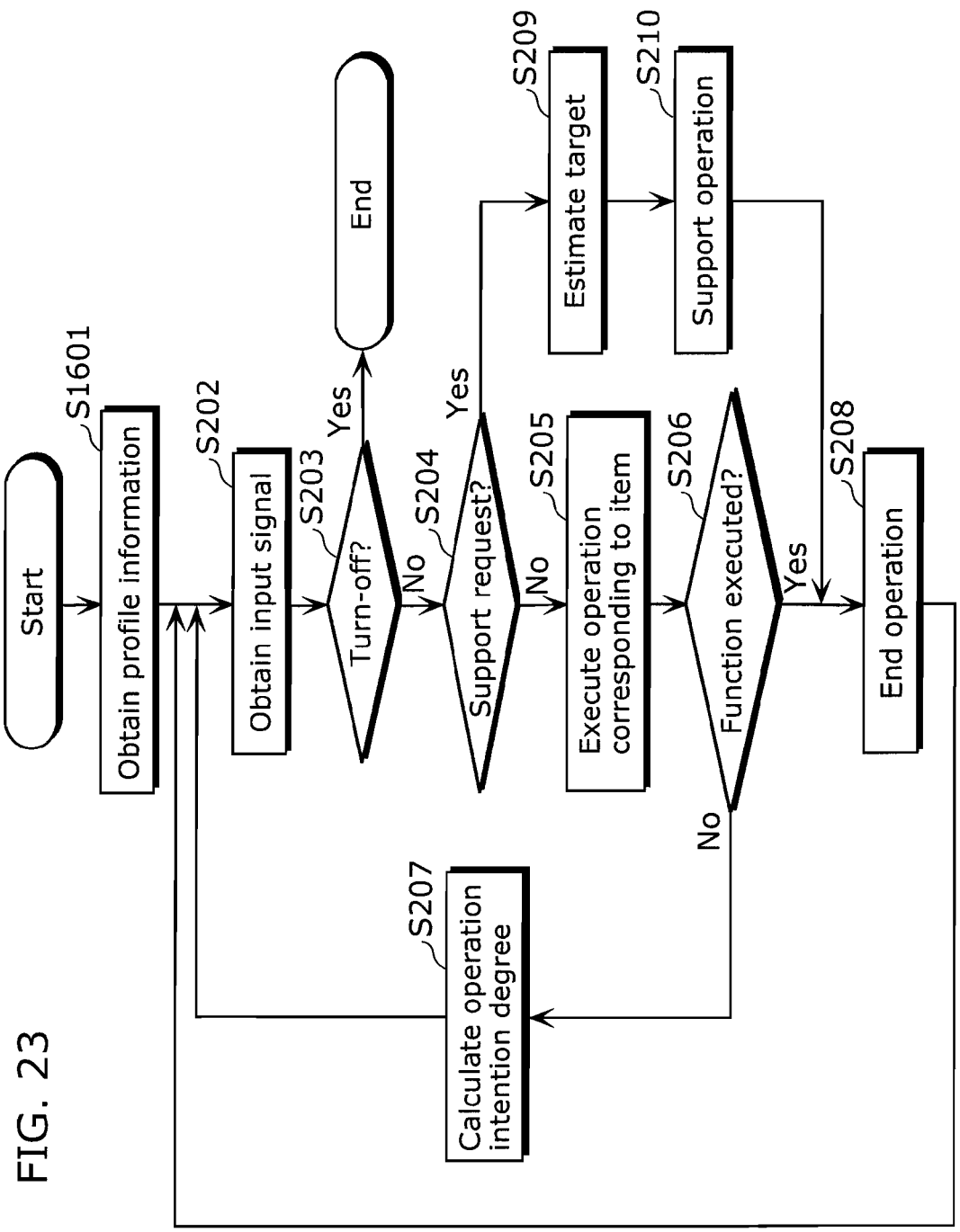
FIG. 23 is a flowchart showing processing in the target estimation device.

FIG. 23 is a flowchart showing processing in the target estimation device 100b of the third embodiment.

First, when the user operates the profile input unit 1401 of the target estimation device 100b, the profile input unit 1401 generates the profile information 1401a, and the profile-dependent calculating unit 1403 obtains the generated profile information 1401a (Step S1601).

Next, the input output control unit 109 of the target estimation device 100b obtains the input signal 121 from the input unit 101 (Step S202). Then, the target estimation device 100b of the third embodiment performs the same processing as the target estimation device 100 in the first embodiment after Step S202.

Although the target estimation device according to the present invention is described using the first to third embodiments, the present invention is not limited to these embodiments.

For example, although the first to third embodiments use a DVD as an operated apparatus as an assumption, as long as the operated apparatus includes a menu-selection interface, it may be any other apparatus, such as a cellular phone, a digital television, a car navigation system, and a personal computer.

Furthermore, when scores of each function calculated in Step S209 does not satisfy a predetermined criteria, a message for prompting the user of selecting an item in Step S210 in FIGS. 12, 18, and 23 of the first to third embodiments may be presented to the user. In this case, the input output control unit 109 determines whether or not the scores of each function satisfy the predetermined criteria. When determining that the scores of each function does not satisfy the predetermined criteria, the input output control unit 109 causes the operation support presenting unit 105 to display a message, for example, "perform any operation. Based on the operation, your target will be estimated and informed". In other words, the input output control unit 108 and the operation support presenting unit 105 serve as a message presenting unit. As the target estimation device obtains more operation histories, it can estimate an appropriate target and provide operation support when an operation becomes slow again and the user presses a help button.

Here, the present invention can be applied to a mobile terminal, such as a cellular phone having multiple functions. Thus, even when the user changes a model of a mobile terminal to another and uses the mobile terminal having a user interface different from the one previously used, the present invention allows the user to select a desired function smoothly.

INDUSTRIAL APPLICABILITY

With estimation processing according to a part (category) having an identical word between an item and a function that is an estimation object, the target estimation device having a menu-selection interface according to the present invention has an advantage that a target of the user can be estimated by narrowing down label information described in an item selected by the user to only information focused by the user. For example, the target estimation device may be applicable to a television, a DVD player, a DVD recorder, and a cellular phone each having a hierarchical interface, and is useful as an operation support device for an apparatus, such as a personal computer having an interface that does not show functions therein, unless the user select a menu, such as a pull-down menu.

The invention claimed is:

1. A target estimation device that estimates a function targeted by a user from among functions of an operated apparatus which has a menu including items in a hierarchical structure and which executes the function when the user selects an item corresponding to the function from among the functions, said target estimation device comprising:
   an item obtaining unit configured to obtain an item selected by the user from among the items in the hierarchical structure, the item consisting of a plurality of words;
   a function storing unit configured to store function expressions for each of functions of the operated apparatus, each of the function expressions consisting of a plurality of words and representing one of the functions of the operated apparatus;
   an identical word detecting unit configured to detect a category of a word identical between (i) a category of a word regarding a word included in the function expressions and (ii) a category of a word regarding a word included in the item obtained by said item obtaining unit, for each of the function expressions stored by said function storing unit;
   an intention calculating unit configured, for each of the function expressions stored by said function storing unit, to calculate a second similarity from a plurality of first similarities which are generated by classifying, to each category of a word, a similarity between (i-1) a word belonging to the category of the word in the function expressions and (i-2) a word belonging to the category of the word included in the item, depending on the category detected by said identical word detecting unit, the second similarity being calculated as a degree of intention of the user who has selected the item for the function represented by a function expression;
   a support request input unit configured to receive a signal indicating a support request from the user; and
   an estimation unit configured, for each of the function expressions stored by said function storing unit, to estimate, when the signal indicating the support request is received, a function from among the functions so that the function having a higher degree of an intention is the function targeted by the user, the degree being calculated based on a similarity between (i) the function expressions stored in said function storing unit and (ii) the item obtained by said item obtaining unit before receiving the signal indicating the support request.

2. The target estimation device according to claim 1, wherein the item and each of the function expressions include at least a word indicating an operation object, the function expressions being stored by said function storing unit, and
said intention calculating unit is configured to calculate the degree of the intention using a calculation method that assigns more weight to the word indicating the operation object from among the plurality of words included in the item, when the category detected by said identical word detecting unit is an operation object.

3. The target estimation device according to claim 2, wherein the item and each of the function expressions stored by said function storing unit further include at least a word indicating an operation action for the operation object, and
said intention calculating unit is configured to use the calculation method that assigns more weight to a semantic similarity between a word that indicates the operation object and is included in an item, and a function expression including a word that indicates the operation object and a word that indicates the operation action than a semantic similarity between a word that indicates the operation action and is included in the item, and the function expression including the word that indicates the operation object and the word that indicates the operation action.

4. The target estimation device according to claim 2, further comprising
a profile information obtaining unit configured to obtain profile information indicating a characteristic of the user,
wherein said intention calculating unit is configured to adjust the weight according to the profile information.

5. The target estimation device according to claim 1, wherein the item and each of the function expressions stored by said function storing unit include at least a word indicating an operation action, and
said intention calculating unit is configured to calculate the degree of the intention using a calculation method that assigns more weight to one of the words indicating the operation action from among the words included in the item, when the category of the word detected by said identical word detecting unit is an operation action.

6. The target estimation device according to claim 5, wherein the item and each of the function expressions stored by said function storing unit further include at least a word indicating an operation object for the operation action, and
said intention calculating unit is configured to use the calculation method that assigns more weight to a semantic similarity a semantic similarity between a word that indicates the operation action and is included in an item, and a function expression including a word that indicates the operation object and a word that indicates the operation action than a semantic similarity between a word that indicates the operation object and is included in the item, and the function expression including the word that indicates the operation object and the word that indicates the operation action.

7. The target estimation device according to claim 1, further comprising:

an intention memory in which a degree of an intention calculated by said intention calculating unit for each of the functions is stored; and an intention storing unit configured to store, in said intention memory, degrees of intentions calculated for each of the functions by said intention calculating unit, each time said item obtaining unit obtains an item, wherein said estimation unit is configured to read, from said intention storing unit, the degrees of the intentions between each of the functions and each of the plurality of items, to calculate an average of the degrees of the intentions for each of the functions as a score, and to estimate a function so that the function having a higher score is the function targeted by the user.

8. The target estimation device according to claim 7, further comprising a presenting unit configured to present the targeted function estimated by said estimation unit to the user.

9. The target estimation device according to claim 7, further comprising:

a confused state detecting unit configured to detect whether or not the user is confused about selecting an item; and a presenting unit configured to present the targeted function estimated by said estimation unit to the user, wherein said estimation unit is configured to estimate the function targeted by the user, when said confused state detecting unit detects that the user is confused.

10. The target estimation device according to claim 7, further comprising a message presenting unit configured to determine whether or not the score for each of the functions satisfies a predetermined condition, and to present a message prompting the user to select an item when the score does not satisfy the predetermined condition, the score being calculated by said estimation unit.

11. A target estimation method for estimating a function targeted by a user from among functions of an operated apparatus which has a menu including items in a hierarchical structure and which executes the function when the user selects an item corresponding to the function from among the functions, said target estimation method comprising:

obtaining an item selected by the user, the item consisting of a plurality of words from among the items in the hierarchical structure;

detecting a category of a word identical between (i) a category of a word regarding a word included in the function expressions and (ii) a category of a word regarding a word included in the item obtained in said obtaining, for each of the function expressions of the operated apparatus, using a function storing unit that stores the function expressions each consisting of a plurality of words and representing one of the functions;

for each of the function expressions stored in the function storing unit, calculating a second similarity from a plurality of first similarities which are generated by classifying, to each category of a word, a similarity between (i-1) a word belonging to the category of the word in the function expressions and (i-2) a word belonging to the category of the word included in the item, depending on the category detected in said detecting, the second similarity being calculated as a degree of intention of the user who has selected the item for the function represented by a function expression; and receiving a signal indicating a support request from the user; and for each of the function expressions stored by the function storing unit, estimating, when the signal indicating the support request is received, a function from among the functions so that the function having a higher degree of an intention is the function targeted by the user, the degree being calculated based on a similarity between (i) the function expressions stored in the function storing unit and (ii) the item obtained in said obtaining before receiving the signal indicating the support request.

12. A non-transitory computer-readable medium having a program recorded thereon for estimating a function targeted by a user from among functions of an operated apparatus which has a menu including items in a hierarchical structure and which executes the function when the user selects an item corresponding to the function from among the functions, said program causing a computer to execute:

obtaining an item selected by the user, the item consisting of a plurality of words from among the items in the hierarchical structure;

detecting a category of a word identical between (i) a category of a word regarding a word included in the function expressions and (ii) a category of a word regarding a word included in the item obtained in said obtaining, for each of the function expressions of the operated apparatus, using a function storing unit that stores the function expressions each consisting of a plurality of words and representing one of the functions;

for each of the function expressions stored in the function storing unit, calculating a second similarity from a plurality of first similarities which are generated by classifying, to each category of a word, a similarity between (i-1) a word belonging to the category of the word in the function expressions and (i-2) a word belonging to the category of the word included in the item, depending on the category detected in said detecting, the second similarity being calculated as a degree of intention of the user who has selected the item for the function represented by a function expression; and receiving a signal indicating a support request from the user; and for each of the function expressions stored by the function storing unit, estimating, when the signal indicating the support request is received, a function from among the functions so that the function having a higher degree of an intention is the function targeted by the user, the degree being calculated based on a similarity between (i) the function expressions stored in the function storing unit and (ii) the item obtained in said obtaining before receiving the signal indicating the support request.

* * * * *